United States Patent
Haderbache et al.

(10) Patent No.: US 10,649,814 B2
(45) Date of Patent: May 12, 2020

(54) DEVICE, METHOD, AND MEDIUM FOR EXECUTING A COMPUTING PROCESS WITHIN AN ACCESSED MONITORING REGION

(71) Applicant: FUJITSU LIMITED, Kawasaki-shi, Kanagawa (JP)

(72) Inventors: Amir Haderbache, Kawasaki (JP); Saso Stanovnik, Log pri Brezovici (SI); Masahiro Miwa, Kawaguchi (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/035,118

(22) Filed: Jul. 13, 2018

(65) Prior Publication Data
US 2019/0026159 A1 Jan. 24, 2019

(30) Foreign Application Priority Data
Jul. 18, 2017 (JP) .................. 2017-139449

(51) Int. Cl.
| G06F 9/455 | (2018.01) |
| G06F 9/50 | (2006.01) |
| G06F 12/1036 | (2016.01) |
| G06F 12/02 | (2006.01) |
| G06F 12/14 | (2006.01) |
| G06N 3/08 | (2006.01) |

(52) U.S. Cl.
CPC .......... *G06F 9/5044* (2013.01); *G06F 12/023* (2013.01); *G06F 12/1036* (2013.01); *G06F 12/145* (2013.01); *G06N 3/08* (2013.01)

(58) Field of Classification Search
None
See application file for complete search history.

(56) References Cited

U.S. PATENT DOCUMENTS
| 2003/0195940 A1 | 10/2003 | Basu et al. |
| 2004/0068627 A1 | 4/2004 | Sechrest et al. |
| 2013/0036282 A1 | 2/2013 | Kawachiya et al. |

FOREIGN PATENT DOCUMENTS
| JP | 2004-133934 | 4/2004 |
| JP | 2005-501535 | 1/2006 |
| JP | 2013-033412 | 2/2013 |

*Primary Examiner* — Gregory A Kessler
(74) *Attorney, Agent, or Firm* — Fujitsu Patent Center

(57) ABSTRACT

An information processing device includes a memory storing information indicating a virtual address space for data to be processed; and a processor that executes, via the virtual address space, a given process on the data to be processed, monitors access from the processor to multiple monitoring regions among a plurality of regions included in the virtual address space and have been set as targets to be monitored, and executes given control based on an accessed monitoring region among the multiple monitoring regions and for which the access has been detected by the processor.

14 Claims, 40 Drawing Sheets

DEVICE, METHOD, AND MEDIUM FOR EXECUTING A COMPUTING PROCESS WITHIN AN ACCESSED MONITORING REGION

CROSS-REFERENCE TO RELATED APPLICATION

This application is based upon and claims the benefit of priority of the prior Japanese Patent Application No. 2017-139449, filed on Jul. 18, 2017, the entire contents of which are incorporated herein by reference.

FIELD

The embodiment discussed herein is related to an information processing device, an information processing method, and a computer-readable recording medium storing a program.

BACKGROUND

In recent years, in order to increase the speed of deep learning in which a large amount of data is processed, the use of distributed parallel computation has been attempted. In distributed deep learning using distributed parallel computation, in order to store training data, a high-performance computing (HPC) parallel file system such as Lustre (trademark) may be used.

A self-regulated memory management system that improves performance for memory management is also known (refer to, for example, Japanese Laid-open Patent Publication No. 2004-133934).

In the HPC parallel file system, multiple data nodes may store training data for deep learning in a distributed manner, and the training data may be easily shared between multiple computing nodes that execute the deep learning in parallel. The training data may be accessed as a memory-mapped file by each of the computing nodes. Since a large amount of data may be processed in the HPC parallel file system, it is preferable that data be supplied based on processing performance of the computing nodes.

SUMMARY

According to an aspect of the embodiments, an information processing device includes a memory storing information indicating a virtual address space for data to be processed; and a processor that executes, via the virtual address space, a given process on the data to be processed, monitors access from the processor to multiple monitoring regions among a plurality of regions included in the virtual address space and have been set as targets to be monitored, and executes given control based on an accessed monitoring region among the multiple monitoring regions and for which the access has been detected by the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment is described in detail with reference to the accompanying drawings.

When a computing node accesses a data node via a communication network, latency occurs due to access to a disk and data transfer, and deep learning is not executed before the arrival of the next training data. Thus, the latency may be a bottleneck of the deep learning. It is, therefore, desirable that the training data be supplied from the data nodes without delay based on the progress of the deep learning in the computing nodes.

The problem occurs not only in distributed deep learning but also in another process of using memory mapping to access data to be processed. In addition, the problem occurs not only in the case where control is executed to supply data to be processed to computing nodes that execute data processing but also in the case where other control related to the data to be processed is executed.

Figure 1:
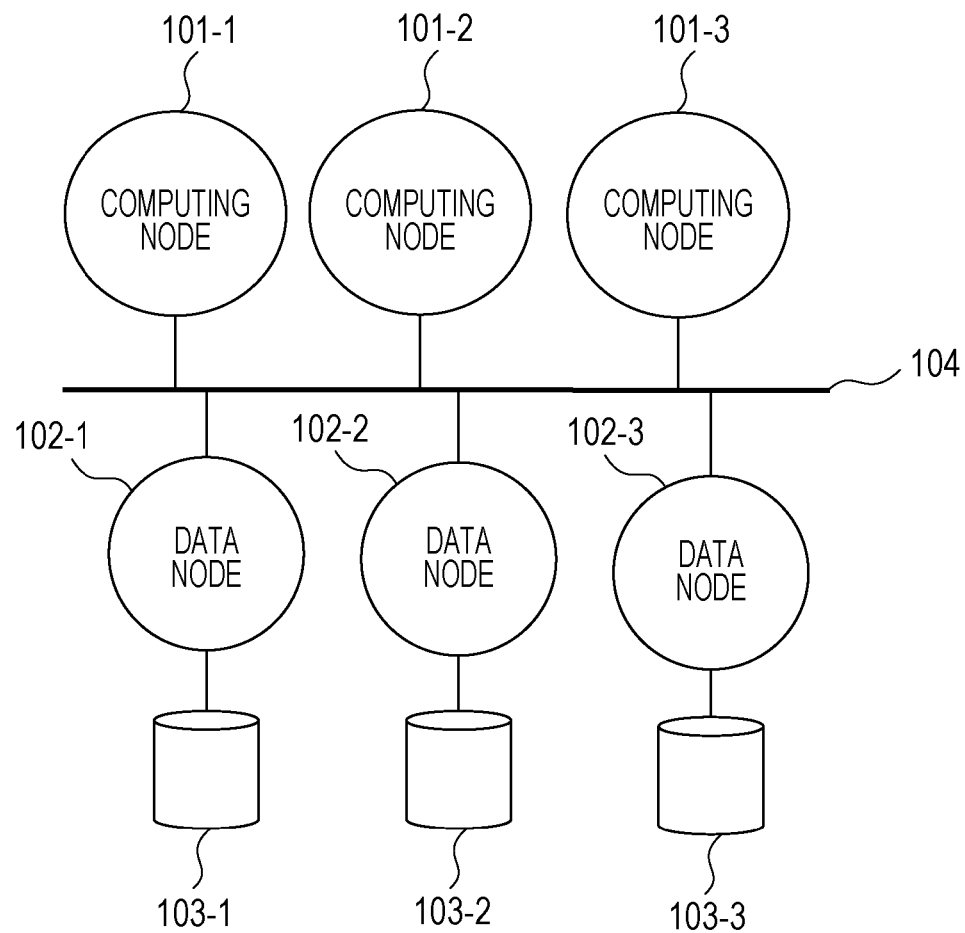
FIG. 1 is a configuration diagram of an HPC parallel file system.

FIG. 1 illustrates an example of the configuration of an HPC parallel file system. The HPC parallel file system illustrated in FIG. 1 includes computing nodes 101-1 to 101-3 and data nodes 102-1 to 102-3. The nodes are connected to each other via a communication network 104. Each of the data nodes 102-$i$ ($i$=1 to 3) has one or more storage devices 103-$i$. The HPC parallel file system may include four or more computing nodes and four or more data nodes.

In the configuration illustrated in FIG. 1, a large amount of data to be processed in deep learning is distributed and stored in the multiple data nodes 102-$i$, and the multiple computing nodes 101-$i$ may share the data to be processed. However, since the computing nodes 101-$i$ acquire data from the data nodes 102-$i$ via the communication network 104, latency occurs due to the data transfer.

Figure 2:
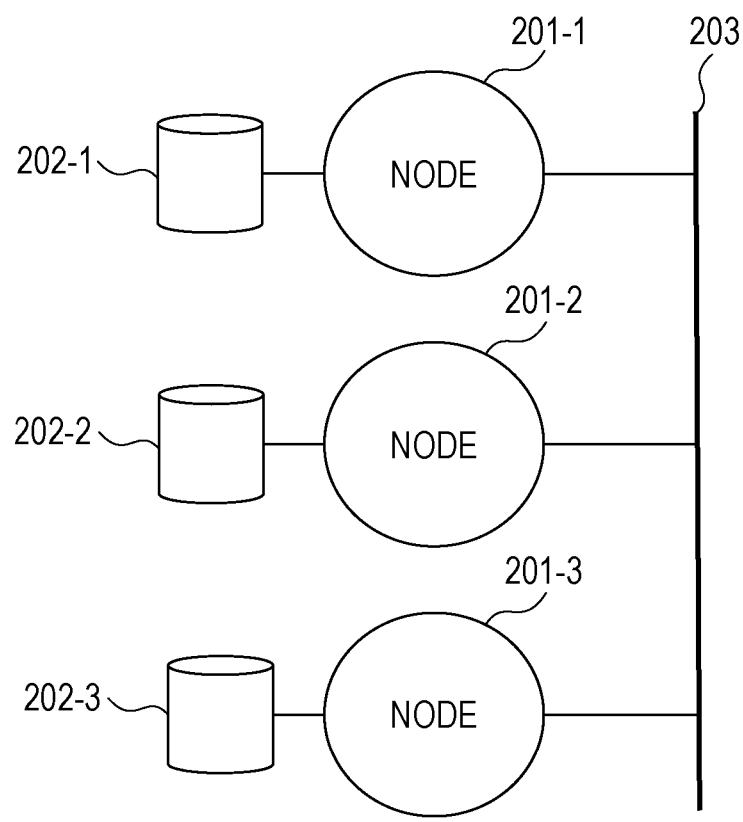
FIG. 2 is a configuration diagram of a distributed file system.

FIG. 2 illustrates an example of the configuration of a distributed file system in which computing nodes are integrated with data nodes by a Hadoop (trademark) approach. The distributed file system illustrated in FIG. 2 includes nodes 201-1 to 201-3 connected to each other via a communication network 203. Each of the nodes 201-$i$ ($i$=1 to 3) has one or more storage devices 202-$i$. The distributed file system may include four or more nodes.

In the configuration illustrated in FIG. 2, the data to be processed is distributed and stored in the multiple nodes 201-$i$, and a replica of data stored in each of the nodes 201-$i$ is stored in another one of the nodes 201-$i$. Since each of the nodes 201-$i$ may acquire data directly from a storage device 202-$i$ of the node 201-$i$ and process the acquired data, the throughput of the nodes 201-$i$ may be improved. However, since data locally exists in the nodes 201-$i$, the distributed file system may not be suitable for HPC.

In order for an HPC parallel file system to execute an application that processes a large amount of data in deep learning or the like, it is desirable to reduce latency caused by data transfer. To reduce the latency, it is effective to install caches in computing nodes and temporarily store data stored in data nodes in the caches.

Figure 3:
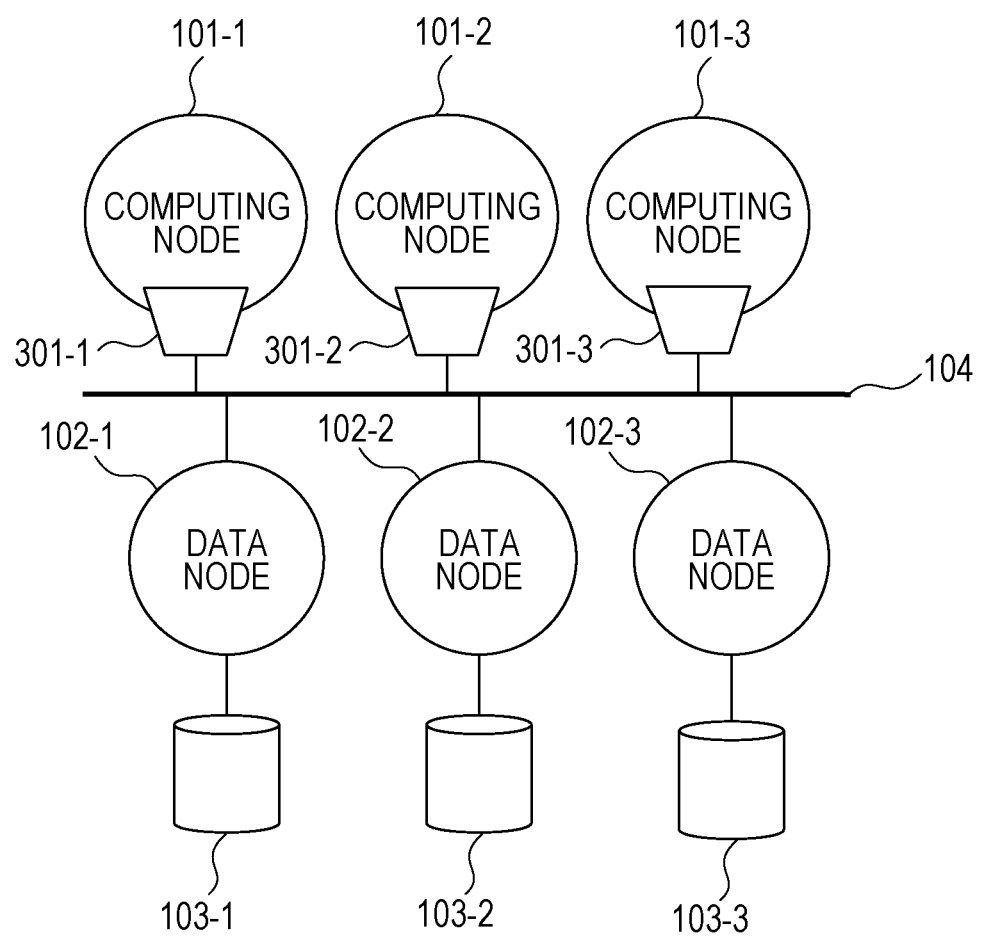
FIG. 3 is a configuration diagram of an HPC parallel file system having caches.

FIG. 3 illustrates an example of the configuration of an HPC parallel file system in which caches are installed in the computing nodes. The HPC parallel file system illustrated in FIG. 3 has a configuration in which caches 301-$i$ are installed in the computing nodes 101-$i$ illustrated in FIG. 1. The caches 301-$i$ temporarily store duplications of data to be used for the computing nodes 101-$i$ to execute processing. The computing nodes 101-$i$ access the caches 301-$i$ instead of the data nodes 102-$i$ to increase the speed of data access.

For example, the computing nodes 101-$i$ may execute deep learning by executing Message Passing Interface-Caffe (MPI-Caffe) that is an application for distributed deep learning. In this case, each of the data nodes 102-$i$ may include a respective Lustre (trademark) object storage server (OSS), and the caches 301-$i$ may be Lustre (trademark) client caches. In addition, the storage devices 103-$i$ may be lightning memory-mapped databases (LMDBs). The LMDBs are an example of key-value stores (IO/Ss).

Figure 4:
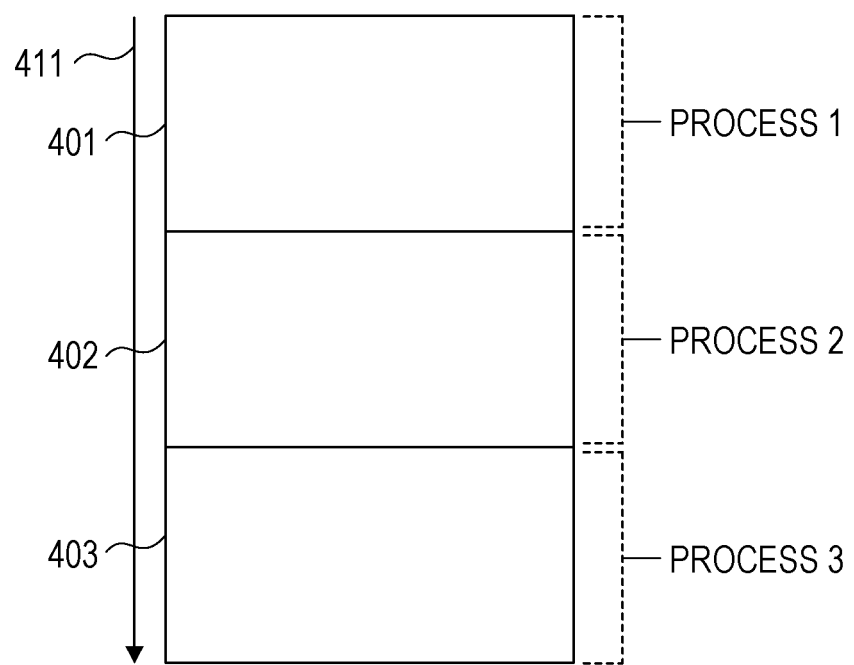
FIG. 4 is a diagram illustrating an LMDB data file.

FIG. 4 illustrates an example of an LMDB data file. The LMDB data file illustrated in FIG. 4 includes data 401 to 403 that is processed by processes 1 to 3 and continuously accessed by the processes 1 to 3, as indicated by an arrow 411.

Figure 5:
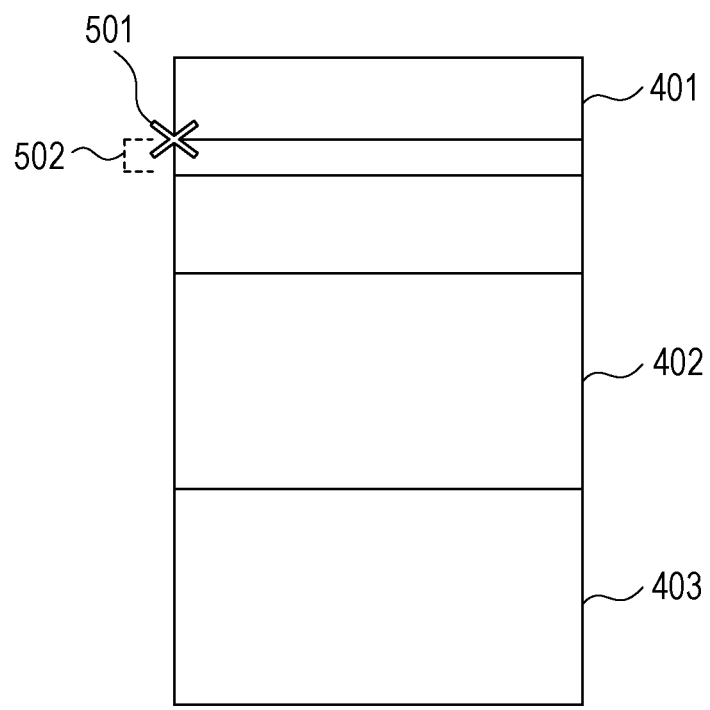
FIG. 5 is a diagram illustrating an accessed position.

FIG. 5 illustrates an example of an accessed position in the LMDB data file illustrated in FIG. 4. If a currently accessed position of the data 401 accessed by the process 1 is a position 501, data to be accessed next by the process 1 is data of a range 502. Thus, if a data access pattern is continuous access and the position 501 is able to be detected, data to be accessed next may be estimated and prefetched from a data node into a cache of a computing node.

Figure 6:
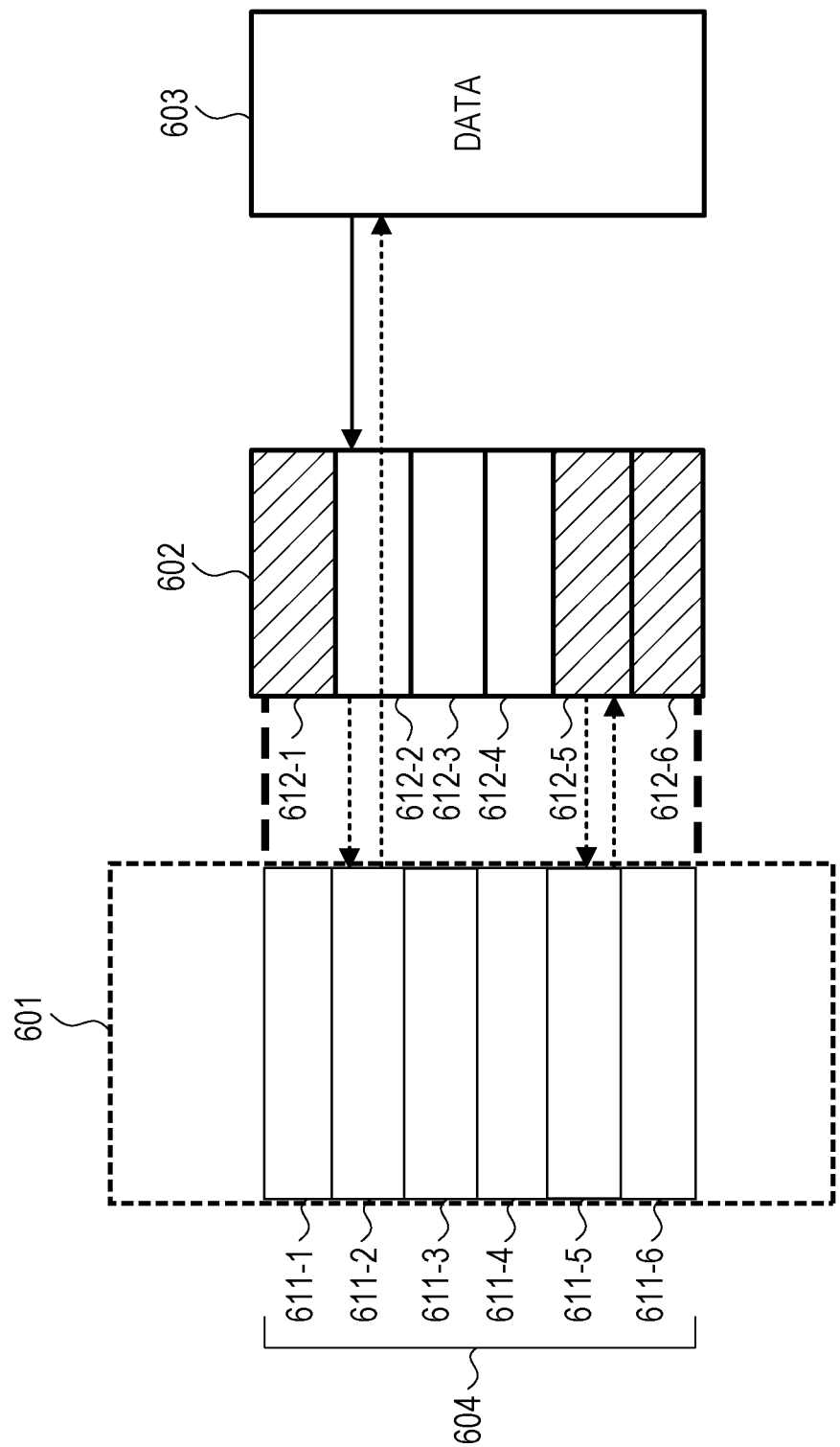
FIG. 6 is a diagram illustrating a virtual address space.

FIG. 6 illustrates an example of a virtual address space of the LMDB data file. Data 603 of the LMDB data file corresponds to data to be processed by a process executed in any of the computing nodes and may be stored in a storage device of any of the data nodes.

In the case where a memory (storage section) 602 corresponds to a memory of the computing node in which the process is executed, and memory mapping is executed using a paging scheme, the data 603 may be stored for each page. A duplication of data transferred from the data node is stored in pages 612-1, 612-5, and 612-6 among pages 612-1 to 612-6 of the memory 602. On the other hand, a duplication of the data is not stored in the pages 612-2 to 612-4.

A virtual address space 601 is a set of virtual addresses to be used for the process to access data, and a region 604 includes virtual addresses of a memory-mapped file. Regions 611-1 to 611-6 included in the region 604 correspond to the pages 612-1 to 612-6, respectively.

The computing node accesses the data 603 via the virtual address space 601 by converting a virtual address output from the process and to be accessed to a physical address of the memory 602. For example, if the virtual address to be accessed corresponds to the page 612-5 including data, the process may directly access the data within the page 612-5.

If the virtual address to be accessed corresponds to the page 612-2 that does not include data, a page fault occurs. Then, the computing node transmits a data transfer request to the data node storing the corresponding data and causes the data received from the data node to be stored in the page 612-2, and the process accesses the data within the page 612-2.

As described above, in the memory mapping using the paging scheme, the virtual addresses within the virtual address space correspond to physical addresses within the memory. Thus, the detection of an accessed position in the LMDB data file is equivalent with the detection of an accessed address within the virtual address space.

Figure 7:
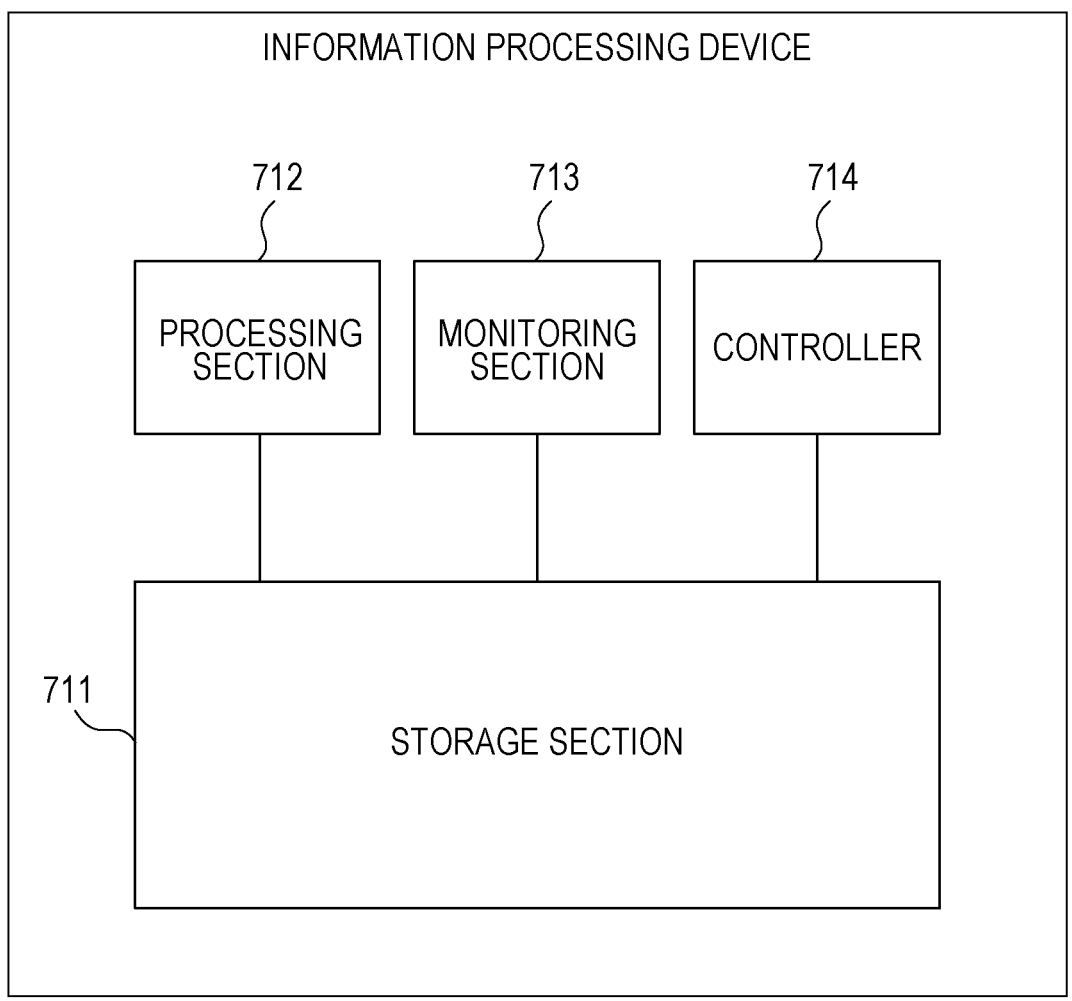
FIG. 7 is a functional configuration diagram of an information processing device.

FIG. 7 illustrates an example of a functional configuration of an information processing device according to the embodiment. The information processing device 701 illustrated in FIG. 7 includes a memory (storage section) 711, a processing section 712, a monitoring section 713, and a controller 714. The memory 711 stores information indicating the virtual address space for the data to be processed. The processing section 712, the monitoring section 713, and the controller 714 execute processes using the virtual address space.

Figure 8:
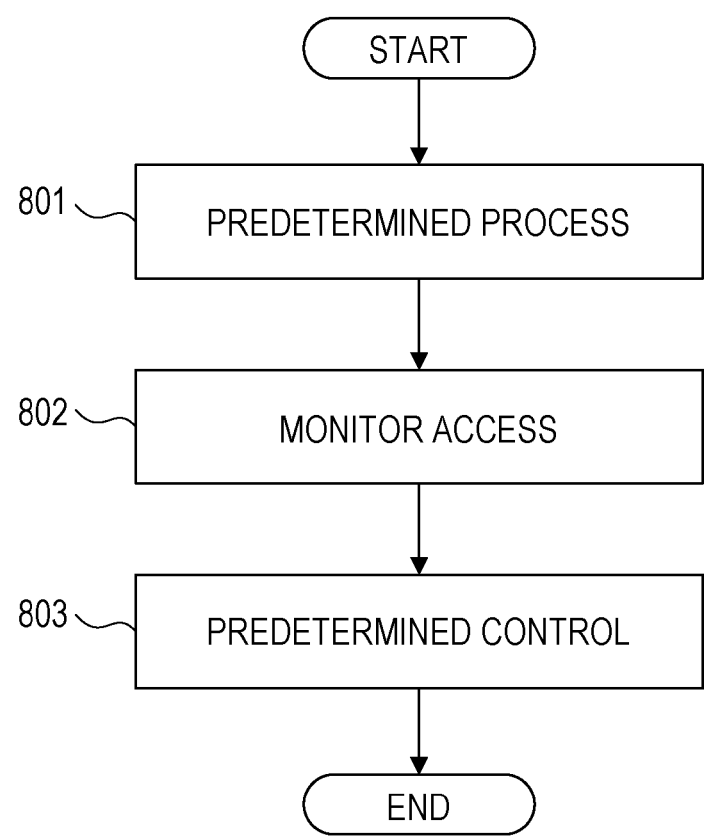
FIG. 8 is a flowchart of a control process.

FIG. 8 is a flowchart of an example of a control process to be executed by the information processing device 701 illustrated in FIG. 7. First, the processing section 712 executes, via the virtual address space, a given process on the data to be processed (in step 801). Next, the monitoring section 713 monitors access from the processing section 712 to multiple monitoring regions set as targets to be monitored among a plurality of regions included in the virtual address space (in step 802). Then, the controller 714 executes given control based on a virtual address of an accessed monitoring region that are among the multiple monitoring regions and for which the access has been detected by the monitoring section 713 (in step 803).

The information processing device 701 illustrated in FIG. 7 may execute, via the virtual address space, control on the data to be processed, based on the progress of a process of accessing the data to be processed.

Figure 9:
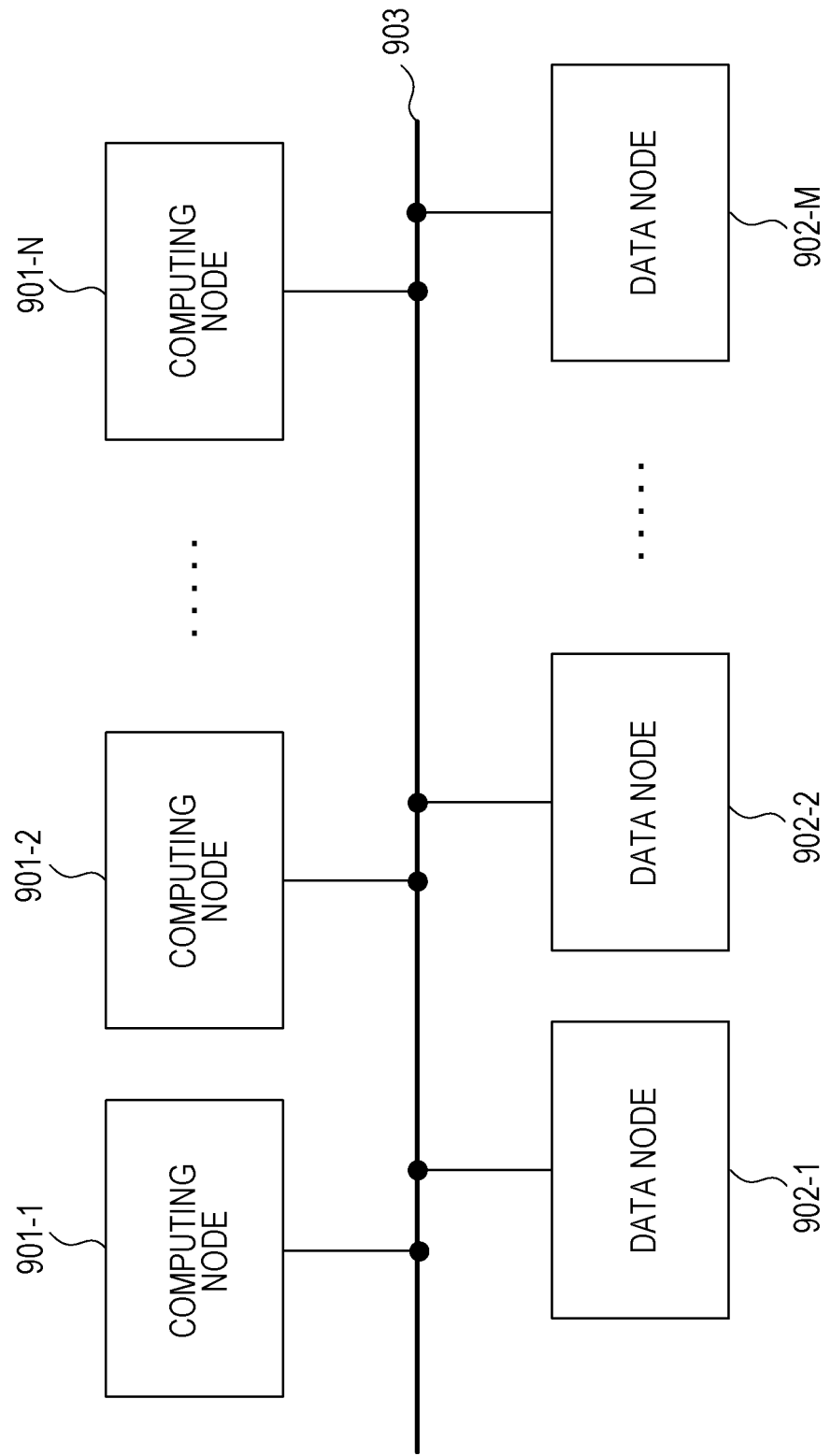
FIG. 9 is a configuration diagram of an information processing system.

FIG. 9 illustrates an example of the configuration of an information processing system including the information processing device 701 illustrated in FIG. 7. The information processing system illustrated in FIG. 9 is, for example, an HPC parallel file system that executes distributed deep learning and includes computing nodes 901-1 to 901-N(N is an integer of 2 or more) and data nodes 902-1 to 902-M (M is an integer of 2 or more). The nodes 901-1 to 901-N and 902-1 to 902-M are connected to each other via a communication network 903.

The data nodes 902-1 to 902-M store, in a distributed manner, the data to be processed and transfer, to the computing nodes 901-*i* (i=1 to N), requested partial data in accordance with data transfer requests from the computing nodes 901-*i*. The computing nodes 901-1 to 901-N use the partial data transferred from the data nodes 902-1 to 902-M to process the data in parallel.

Figure 10:
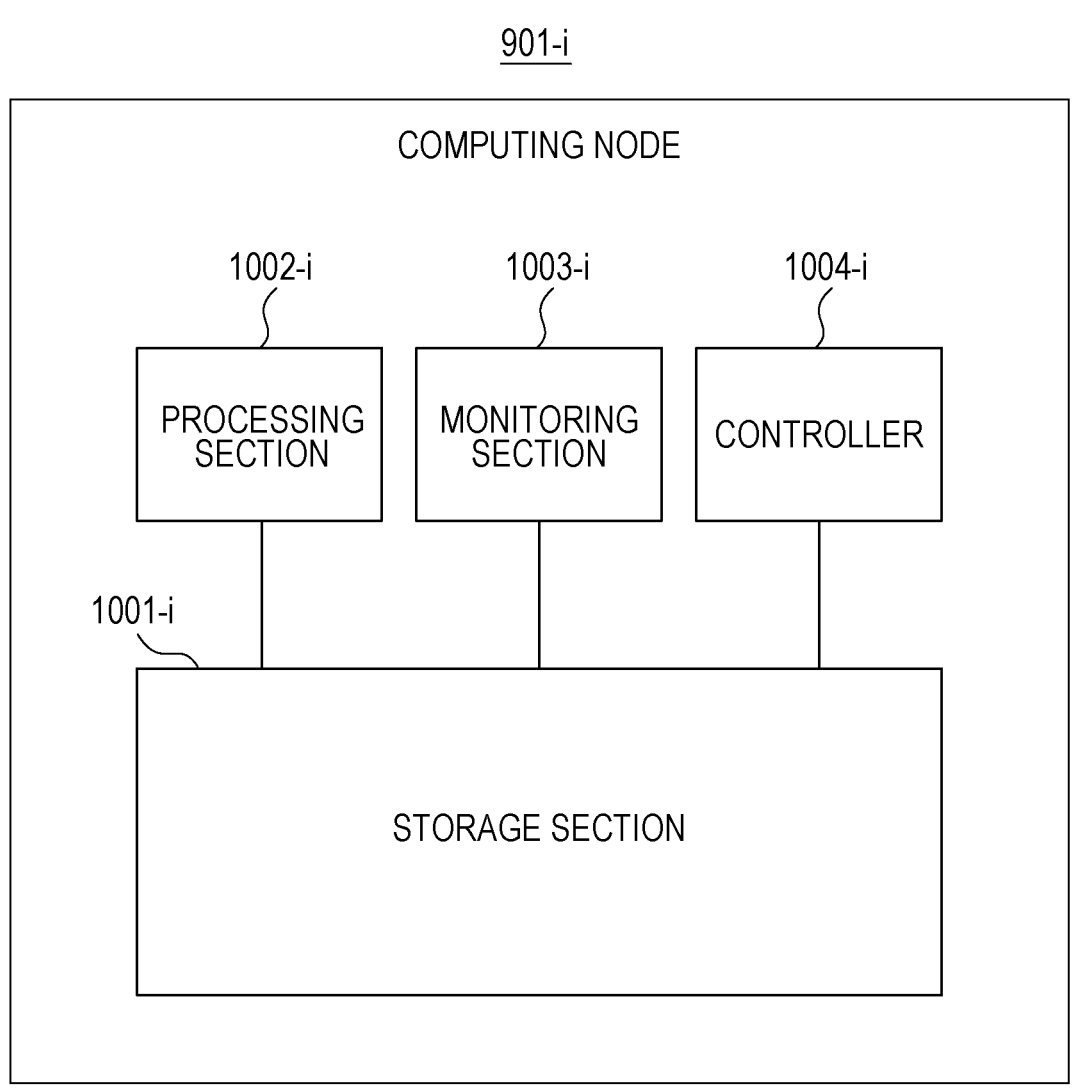
FIG. 10 is a functional configuration diagram of a computing node.

FIG. 10 illustrates an example of a functional configuration of a computing node 901-*i* illustrated in FIG. 9 (i=1 to N). The computing node 901-*i* illustrated in FIG. 10 includes a memory (storage section) 1001-*i*, a processing section 1002-*i*, a monitoring section 1003-*i*, and a controller 1004-*i*. The computing node 901-*i* corresponds to the information processing device 701 illustrated in FIG. 7. The memory 1001-*i*, the processing section 1002-*i*, the monitoring section 1003-*i*, and the controller 1004-*i* correspond to the memory 711, the processing section 712, the monitoring section 713, and the controller 714, respectively.

Figure 11:
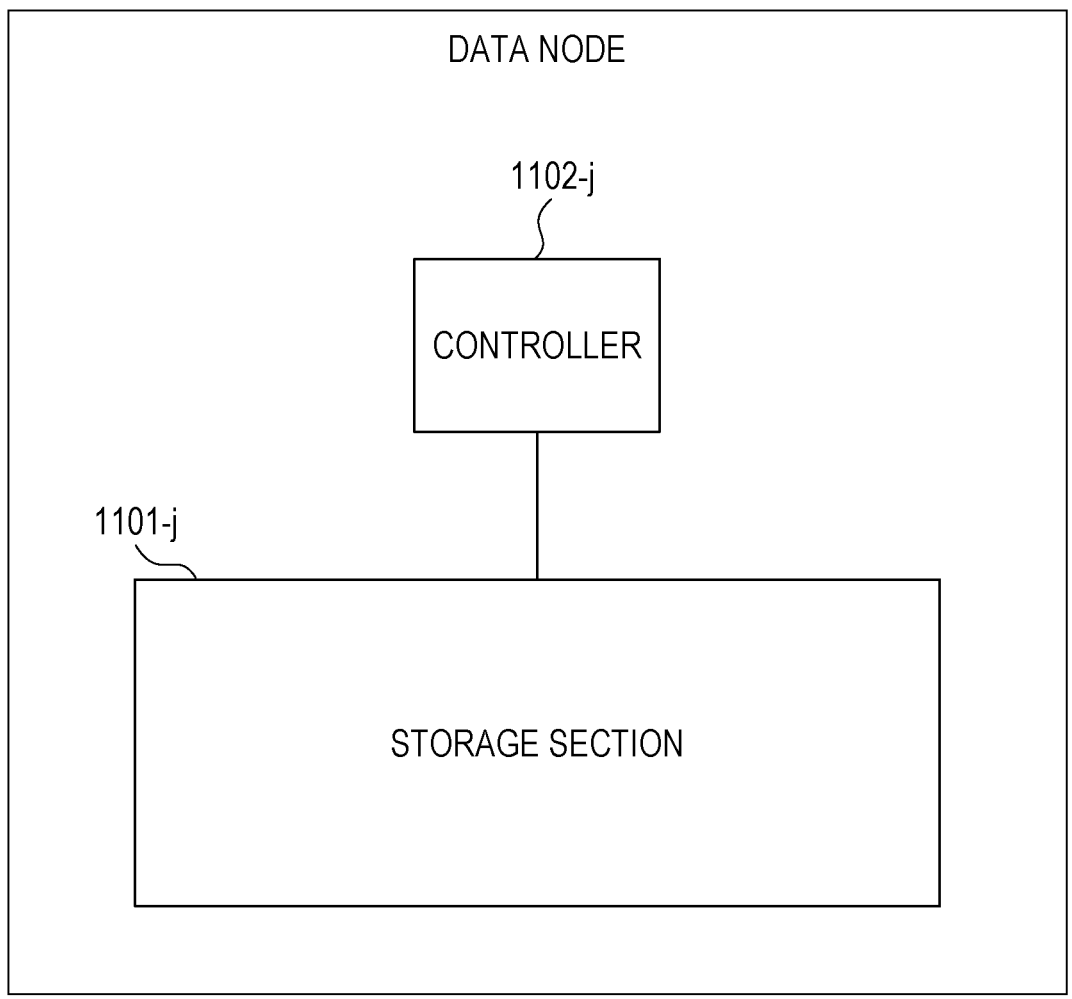
FIG. 11 is a functional configuration diagram of a data node.

FIG. 11 illustrates a functional configuration of a data node 902-*j* (j=1 to M). The data node 902-*j* illustrated in FIG. 11 is a storage device and includes a memory 1101-*j* and a controller 1102-*j*. The memory 1101-*j* stores partial data assigned to the data node 902-*j* among the data to be processed. The controller 1102-*j* executes control to transfer the partial data to a computing node 901-*i* in accordance with a data transfer request from the computing node 901-*i*. The memory 1101-*j* may be a WS such as an LMDB or may be a relational database (RDB).

The memories 1001-*i* of the computing nodes 901-*i* operate as caches, store partial data transferred from the data nodes 902-*j*, and store the information indicating the virtual address space for the data to be processed. The partial data stored in the memories 1001-*i* corresponds to virtual addresses of regions among the multiple regions included in the virtual address space. The processing section 1002-*i* accesses, via the virtual address space, the data to be processed and executes deep learning using the data to be processed.

The monitoring section 1003-*i* sets multiple monitoring sections in the virtual address space, monitors access from the processing section 1002-*i* to the monitoring regions, and outputs, to the controller 1004-*i*, a virtual address of an accessed monitoring region for which the access has been detected by the processing section 1002-*i*. The controller 1004-*i* prefetches partial data from a data node 902-*j* based on the virtual address output by the monitoring section 1003-*i* and causes the prefetched partial data to be stored in the memory 1001-*i*.

In this case, the controller 1004-*i* estimates, based on the virtual address output by the monitoring section 1003-*i*, an address range of virtual addresses to be accessed by the processing section 1002-*i*. Then, the controller 1004-*i* transmits a data transfer request to a data node 902-*j* storing partial data of the estimated address range and causes the partial data received from the data node 902-*j* to be stored in the memory 1001-*i*.

Figure 12:
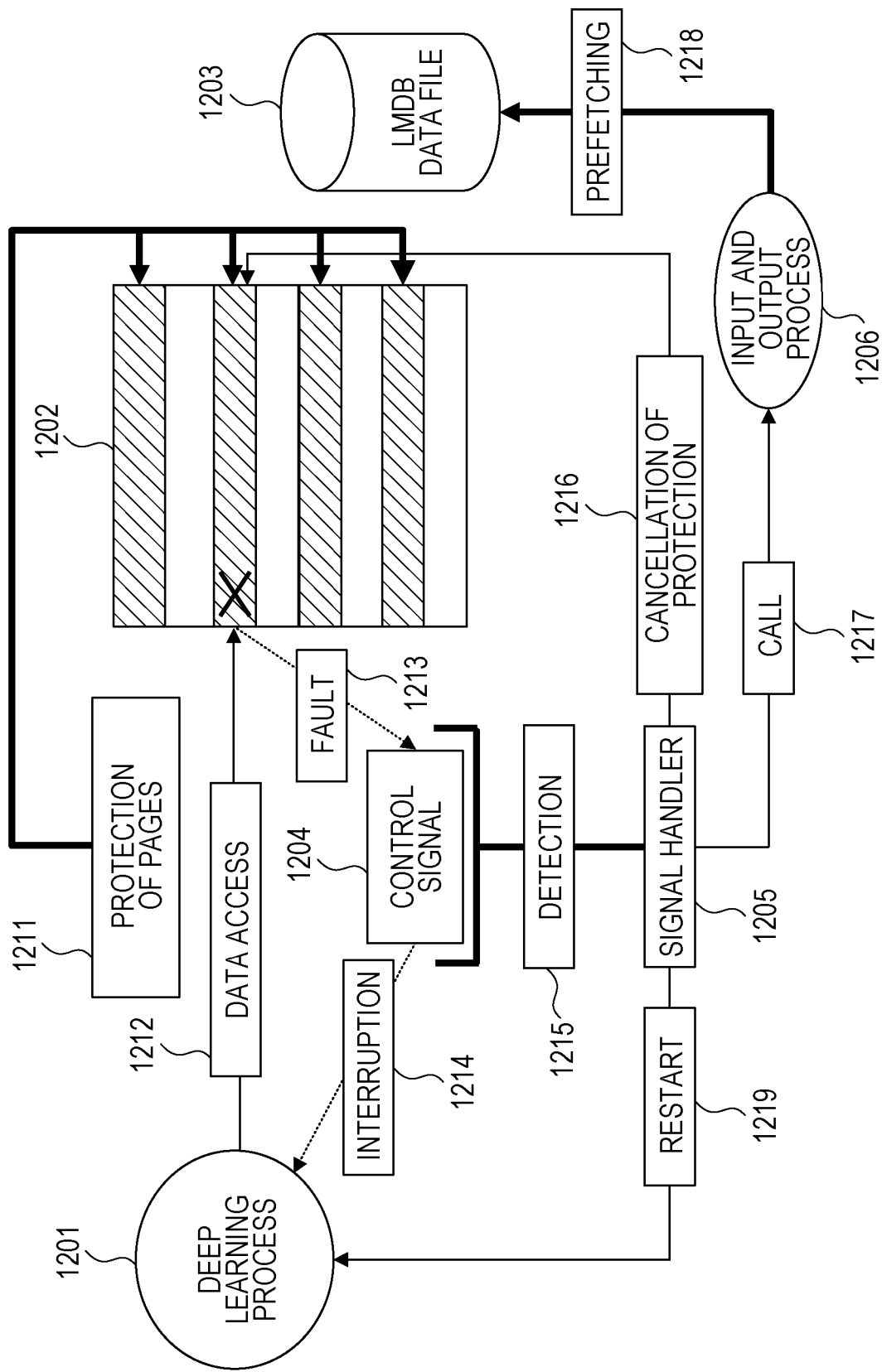
FIG. 12 is a diagram illustrating a control process in distributed deep learning.

FIG. 12 illustrates an example of a control process in distributed deep learning executed by each computing node 901-*i* illustrated in FIG. 9. A deep learning process 1201 is a process generated by the processing section 1002-*i*. A signal handler 1205 is a process generated by the monitoring section 1003-*i*. An input and output process 1206 is a process generated by the controller 1004-*i*.

An LMDB data file 1203 includes training data (data to be processed) for deep learning. The training data may be an image, sound data, or a text. For example, if the deep learning process 1201 executes deep learning for image recognition, the LMDB data file 1203 includes multiple images.

A memory-mapped address space 1202 is information indicating a virtual address space of the LMDB data file 1203. In this case, pages of the LMDB data file 1203 correspond to regions included in the memory-mapped address space 1202. The regions of the memory-mapped address space 1202 include virtual addresses of ranges corresponding to the pages.

First, the monitoring section 1003-*i* protects regions among the multiple regions included in the memory-mapped address space 1202 (in step 1211). By executing the process of step 1211, the protected regions are set as monitoring regions, and pages corresponding to the monitoring regions are protected. For example, the monitoring section 1003-*i* uses a system call such as mprotect to inhibit access to the regions within the memory-mapped address space 1202 and protect the regions. In the example illustrated in FIG. 12, regions indicated by oblique lines and included in the memory-mapped address space 1202 correspond to the monitoring regions that are set so that the monitoring regions are not adjacent to each other.

Next, the deep learning process 1201 accesses the multiple regions included in the memory-mapped address space 1202 in given order to access the LMDB data file 1203 and executes deep learning using accessed data (in step 1212).

When the deep learning process 1201 accesses a virtual address of a monitoring region, a control signal 1204 that indicates access (fault) to the protected region is generated (in step 1213). For example, as the control signal 1204, a signal segmentation violation (SIGSEGV) signal may be used. When the control signal 1204 is generated, the signal handler 1205 interrupts a process of the deep learning process 1201 (in step 1214).

The signal handler 1205 detects the control signal 1204 (in step 1215), identifies the accessed monitoring region based on the control signal 1204, and cancels the protection of the identified monitoring region (in step 1216). Then, the signal handler 1205 outputs, to the controller 1004-i, the virtual address of the monitoring region for which the protection has been canceled, and the signal handler 1205 calls the input and output process 1206 (in step 1217).

The input and output process 1206 prefetches, from a corresponding data node 902-j, partial data that is included in the LMDB data file 1203 and is in an address range to be accessed next by the deep learning process 1201 (in step 1218). Then, the signal handler 1205 restarts the process of the deep learning process 1201 (in step 1219). Thus, the deep learning process 1201 may access a page corresponding to the monitoring region for which the protection has been canceled, and the deep learning process 1201 may continue to execute the deep learning.

Not only when the deep learning process 1201 accesses any of the monitoring regions but also when the input and output process 1206 accesses any of the monitoring regions for prefetching, the control signal 1204 is generated.

In the control process illustrated in FIG. 12, a kernel-level page fault signal may be used as the control signal 1204, instead of the SIGSEGV signal. In this case, a kernel-level exception handler is used instead of the signal handler 1205 and detects the occurrence of an exception in step 1215.

Figure 13:
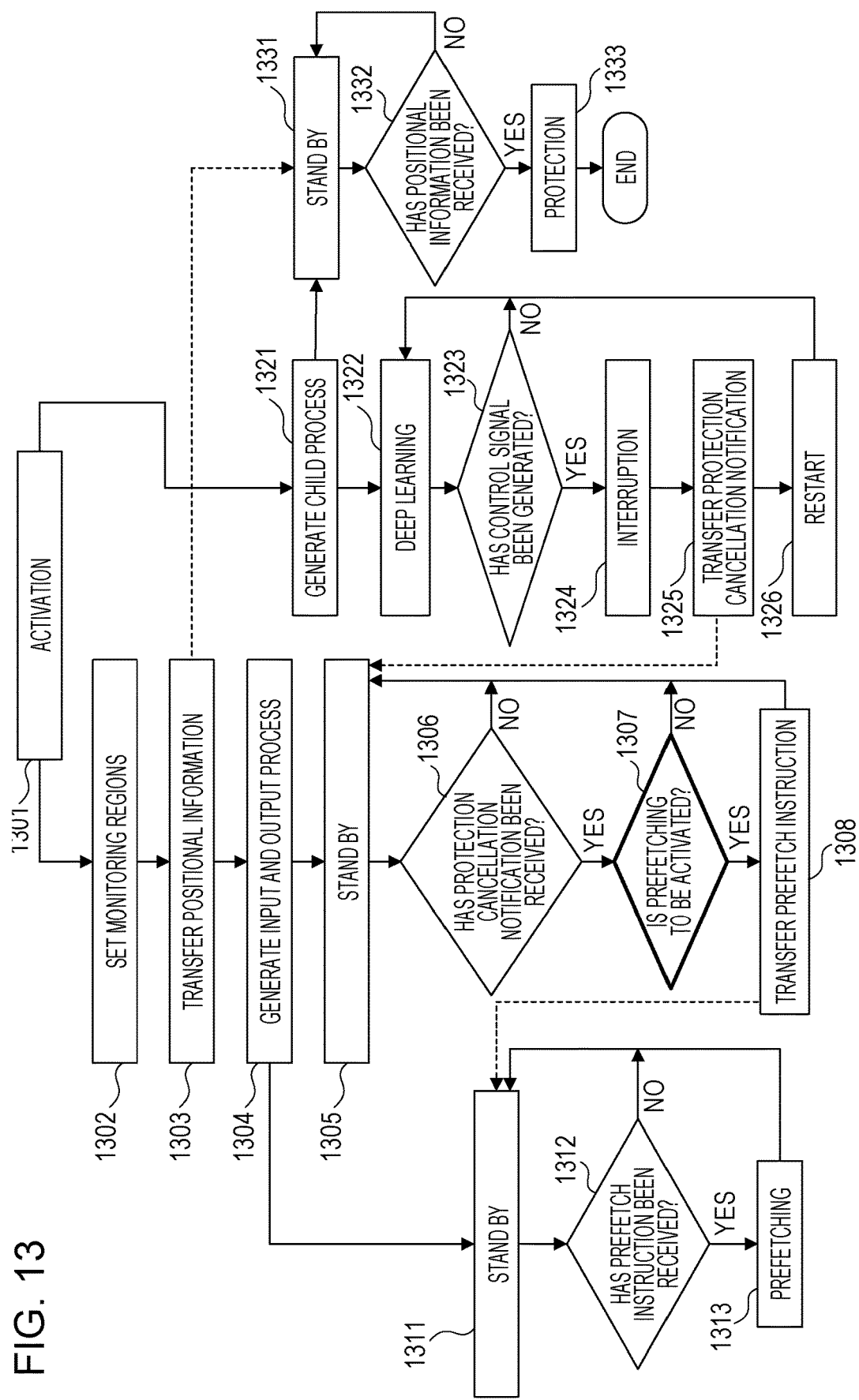
FIG. 13 is a flowchart of the control process in the distributed deep learning.

FIG. 13 is a flowchart of a specific example of the control process in the distributed deep learning. First, the processing section 1002-i activates the deep learning process 1201, and the monitoring section 1003-i injects an additional code for a monitoring process into a program of the deep learning process 1201 (in step 1301). For example, the monitoring section 1003-i uses an environment variable such as LD_PRELOAD to inject the additional code into the program of the deep learning process 1201. A code for generating the signal handler 1205 is included in the additional code.

Next, the monitoring section 1003-i executes processes of steps 1302, 1303, 1321, 1323 to 1326, and 1331 to 1333. The processes of steps 1321, 1323 to 1326, and 1331 to 1333 are executed based on the injected additional code.

The processing section 1002-i uses the deep learning process 1201 to execute a process of step 1322, and the controller 1004-i executes processes of steps 1304 to 1308 and 1311 to 1313. The processes of steps 1311 to 1313 are executed using the input and output process 1206.

The monitoring section 1003-i generates, based on the additional code, a child process of protecting the monitoring regions (in step 1321), and the generated child process waits for positional information indicating the positions of the monitoring regions (in step 1331). The child process checks whether or not the child process has received the positional information from the monitoring section 1003-i (in step 1332). If the child process has not received the positional information (No in step 1332), the child process repeats the processes of steps 1331 and 1332.

The monitoring section 1003-i sets the monitoring regions in the memory-mapped address space 1202 (in step 1302) and transfers the positional information indicating the positions of the set monitoring regions to the child process (in step 1303). If the child process has received the positional information (Yes in step 1332), the child process protects all the monitoring regions indicated by the received positional information (in step 1333).

Next, the controller 1004-i generates the input and output process 1206 (in step 1304), and the input and output process 1206 waits for a prefetch instruction (in step 1311). The input and output process 1206 checks whether or not the input and output process 1206 has received the prefetch instruction from the controller 1004-i (in step 1312). If the input and output process 1206 has not received the prefetch instruction (No in step 1312), the input and output process 1206 repeats the processes of steps 1311 and 1312.

The controller 1004-i waits for a protection cancellation notification from the signal handler 1205 (in step 1305). The controller 1004-i checks whether or not the controller 1004-i has received the protection cancellation notification from the signal handler 1205 (in step 1306). If the controller 1004-i has not received the protection cancellation notification (No in step 1306), the controller 1004-i repeats the processes of steps 1305 and 1306.

The deep learning process 1201 accesses the LMDB data file 1203 and executes the deep learning using accessed data (in step 1322). The signal handler 1205 checks whether or not the control signal 1204 indicating a fault has been generated (in step 1323). If the control signal 1204 has not been generated (No in step 1323), the deep learning process 1201 continues to execute the process of step 1322.

On the other hand, if the control signal 1204 has been generated (Yes in step 1323), the signal handler 1205 interrupts the process of the deep learning process 1201 (in step 1324). Then, the signal handler 1205 identifies an accessed monitoring region based on the control signal 1204, cancels the protection of the identified monitoring region, and protects a monitoring region for which protection has been canceled in the past. In this case, the signal handler 1205 may record the time when the control signal 1204 has been generated, and the signal handler 1205 may calculate a memory access speed based the recorded time.

Next, the signal handler 1205 transfers, to the controller 1004-i, the protection cancellation notification including a virtual address of the monitoring region for which the protection has been canceled (in step 1325), and the signal handler 1205 restarts the process of the deep learning process 1201 (in step 1326). Then, the deep learning process 1201 and the signal handler 1205 repeat the processes of steps 1322 and later.

If the controller 1004-i has received the protection cancellation notification (Yes in step 1306), the controller 1004-i determines, based on the virtual address included in the received protection cancellation notification, whether or not prefetching is to be activated (in step 1307).

For example, if the virtual address included in the protection cancellation notification corresponds to an initial monitoring region, the controller 1004-i activates the prefetching. If the virtual address included in the protection cancellation notification is included in an address range of an activated prefetching operation and does not reach a virtual address corresponding to a given threshold, the controller 1004-i does not activate the new prefetching. If the virtual address included in the protection cancellation notification reaches the virtual address corresponding to the given threshold, the controller 1004-i activates the new prefetching.

If the prefetching is not to be activated (No in step 1307), the controller 1004-i repeats the processes of steps 1305 and later. On the other hand, if the prefetching is to be activated (Yes in step 1307), the controller 1004-i estimates, based on the virtual address included in the protection cancellation notification, an address range of virtual addresses to be accessed next by the deep learning process 1201 (in step 1308). Then, the controller 1004-*i* transfers, to the input and output process 1206, a prefetch instruction to activate the prefetching of partial data of the estimated address range and repeats the processes of steps 1305 and later.

If the input and output process 1206 has received the prefetch instruction (Yes in 1312), the input and output process 1206 prefetches, from a corresponding data node 902-*j*, the partial data of the address range indicated by the prefetch instruction (in step 1313). Then, the input and output process 1206 causes the prefetched partial data to be stored in the memory (storage section) 1001-*i* and repeats the processes of steps 1311 and later.

According to the control process illustrated in FIG. 13, training data to be processed next may be prefetched from the data nodes based on the progress of the deep learning executed by the computing nodes. This reduces latency caused by data transfer between the computing nodes and the data nodes and increases the speed of the distributed deep learning.

Next, an example of the prefetching based on the control process illustrated in FIG. 13 is described with reference to FIGS. 14 to 31.

Figure 14:
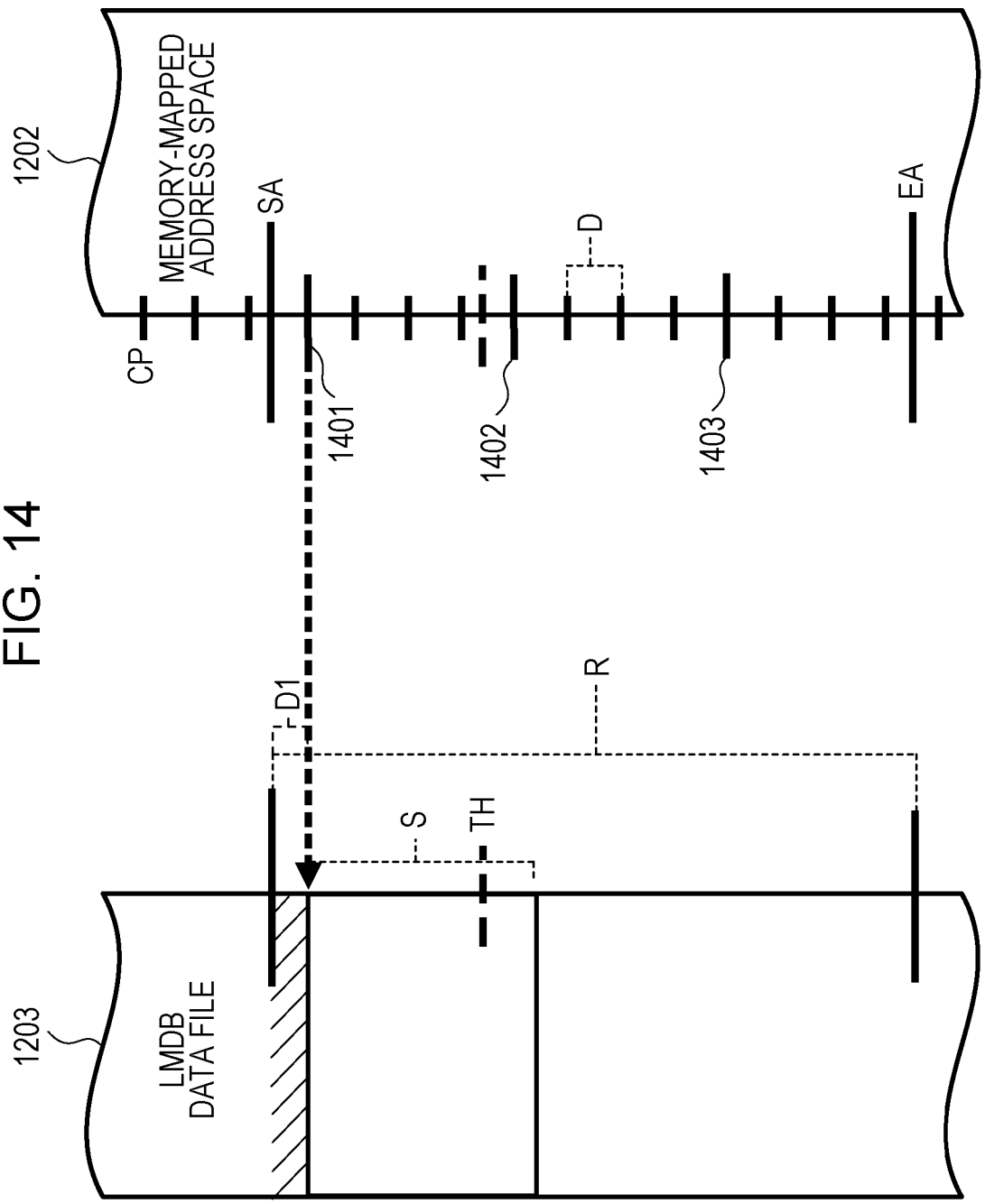
FIG. 14 is a diagram illustrating parameters.

FIG. 14 illustrates an example of parameters to be used in the control process. Multiple checkpoints CP within the memory-mapped address space 1202 are virtual addresses corresponding to positional information indicating the positions of the monitoring regions. A distance D indicates an interval between two adjacent check points CP. In addition, a start address SA and an end address EA are virtual addresses indicating a range R of the data included in the LMDB data file 1203 and to be processed. In this example, the deep learning process 1201 continuously accesses the data from the start address SA to the end address EA.

A distance D1 indicates an interval between the start address SA and a virtual address at which the initial prefetching is activated. Thus, the prefetching is not executed on data of a range corresponding to the distance D1.

A size S indicates the size of data continuously transferred from a data node 902-*j* and to be prefetched in a single prefetching operation. A threshold TH is a threshold for a data amount to be used to determine whether or not new prefetching is activated during prefetching. Check points CP that are among the multiple check points CP and set at positions 1401 to 1403 serve as triggers for activating new prefetching, and each of the other check points CP does not serve as a trigger.

Figure 15:
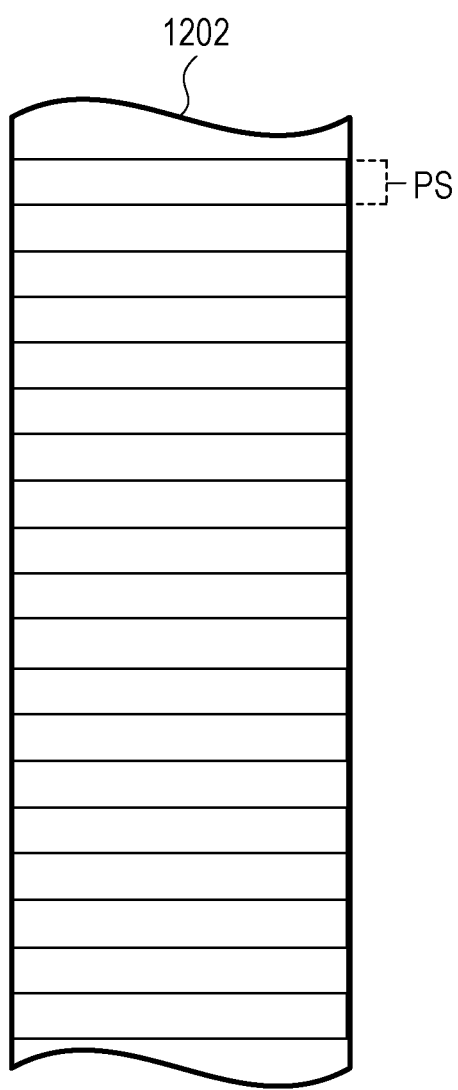
FIG. 15 is a diagram illustrating a first state of a memory-mapped address space.

FIG. 15 illustrates a first state of the memory-mapped address space 1202. In the first state, any check point CP is not set. A page size PS indicates a data amount of each page within the memory 1001-*i*.

Figure 16:
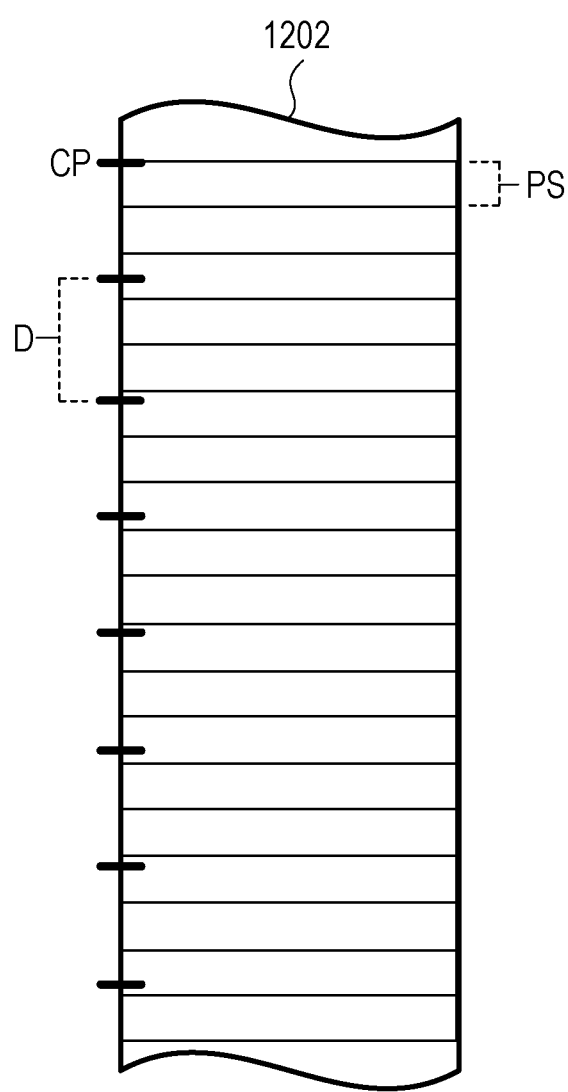
FIG. 16 is a diagram illustrating a second state of the memory-mapped address space.

FIG. 16 illustrates a second state of the memory-mapped address space 1202. In the second state, the monitoring section 1003-*i* sets the multiple check points CP using, as an interval between adjacent check points CP, the distance D corresponding to a data amount larger than the page size PS.

Figure 17:
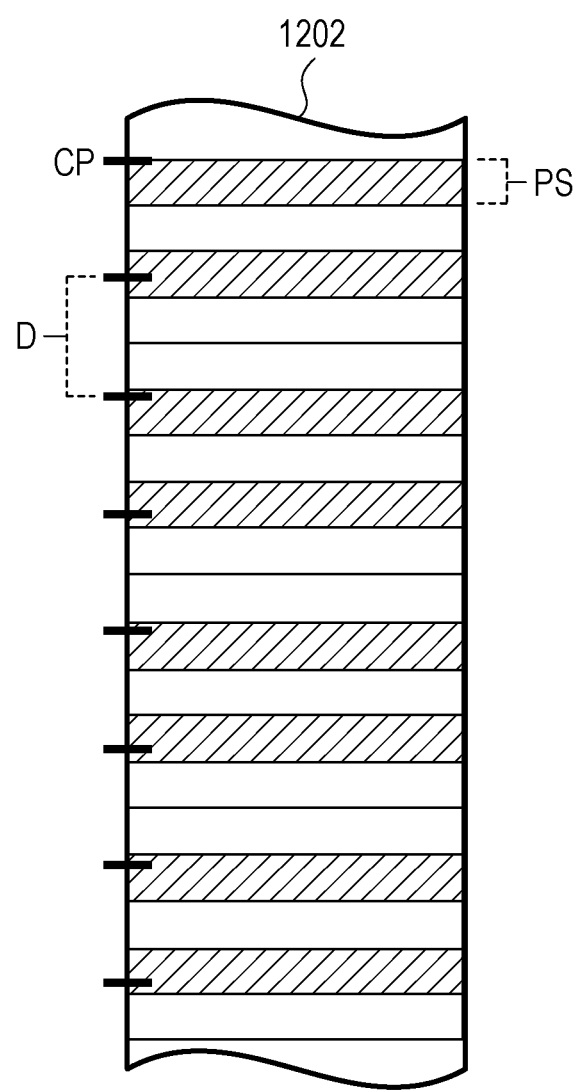
FIG. 17 is a diagram illustrating a third state of the memory-mapped address space.

FIG. 17 illustrates a third state of the memory-mapped address space 1202. In the third state, the child process generated by the monitoring section 1003-*i* protects monitoring regions corresponding to pages including the check points CP, as indicated by oblique lines.

Figure 18:
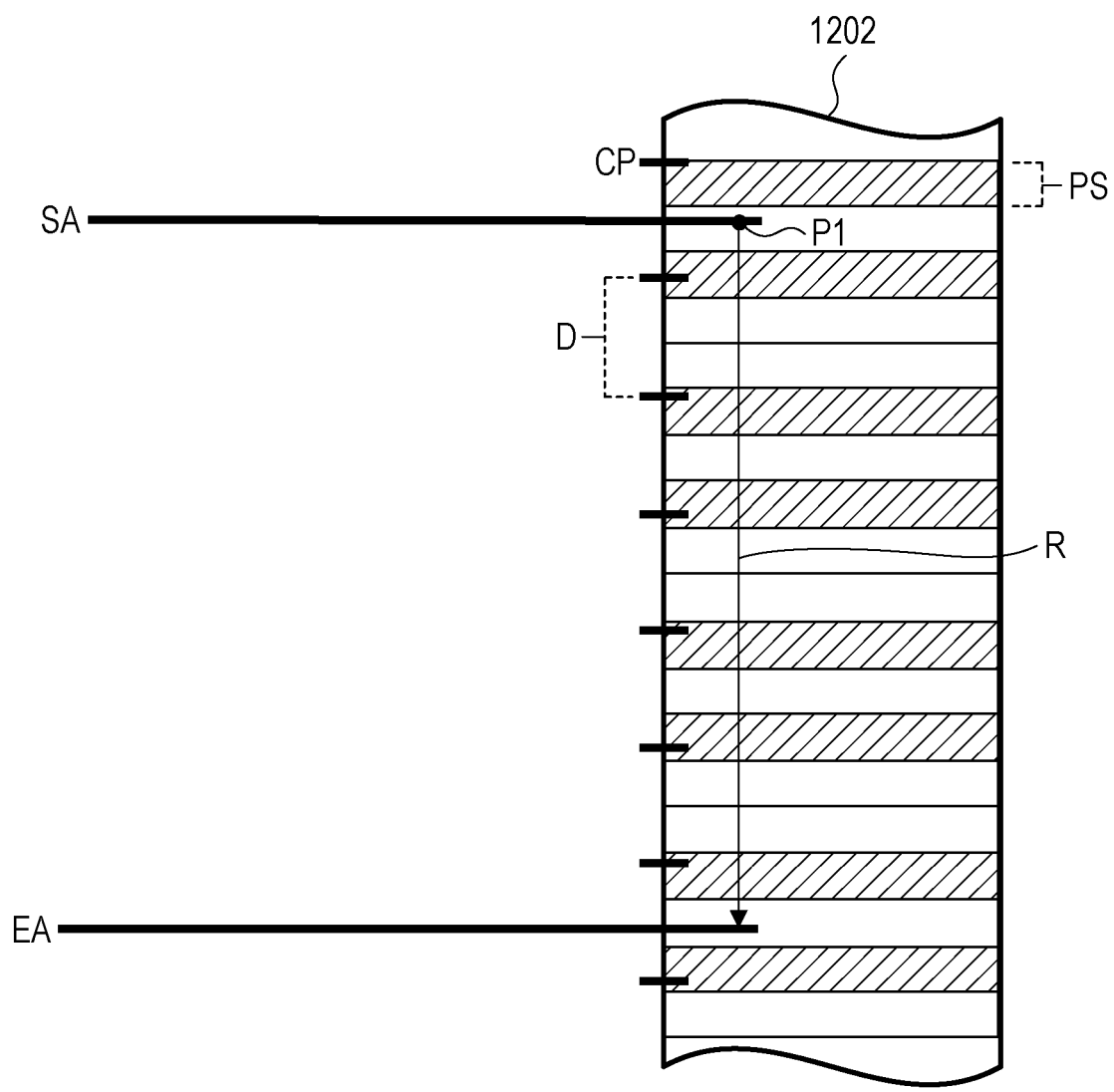
FIG. 18 is a diagram illustrating a fourth state of the memory-mapped address space.

FIG. 18 illustrates a fourth state of the memory-mapped address space 1202. In the fourth state, the deep learning process 1201 accesses the start address SA and starts the deep learning on the data that is in the range R and to be processed. A pointer P1 points a virtual address currently accessed by the deep learning process 1201.

Figure 19:
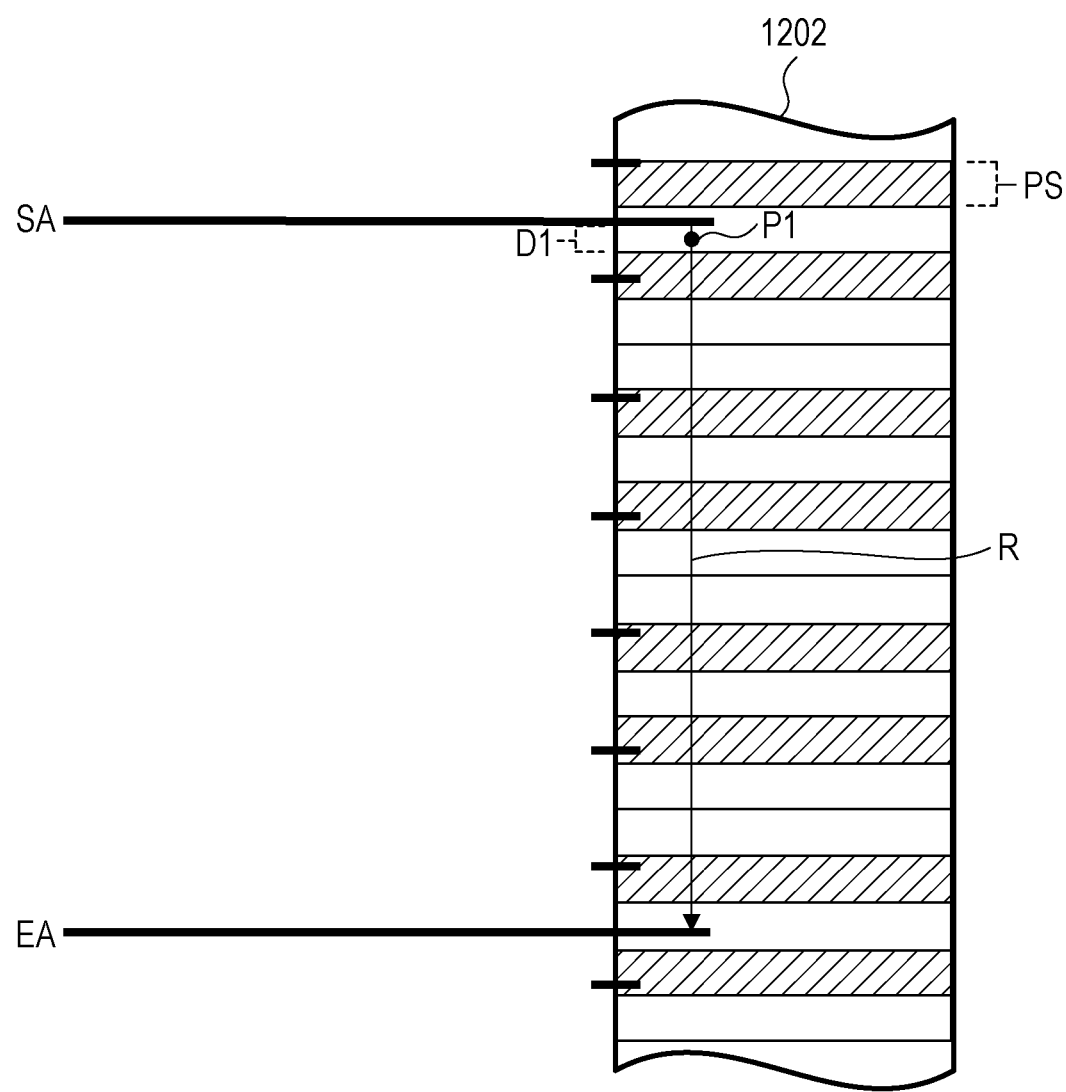
FIG. 19 is a diagram illustrating a fifth state of the memory-mapped address space.

FIG. 19 illustrates a fifth state of the memory-mapped address space 1202. In the fifth state, the pointer P1 exists in a certain range ranging from the start address SA and corresponding to the distance D1, the certain range does not correspond to a monitoring region, and the control signal 1204 is not generated.

Figure 20:
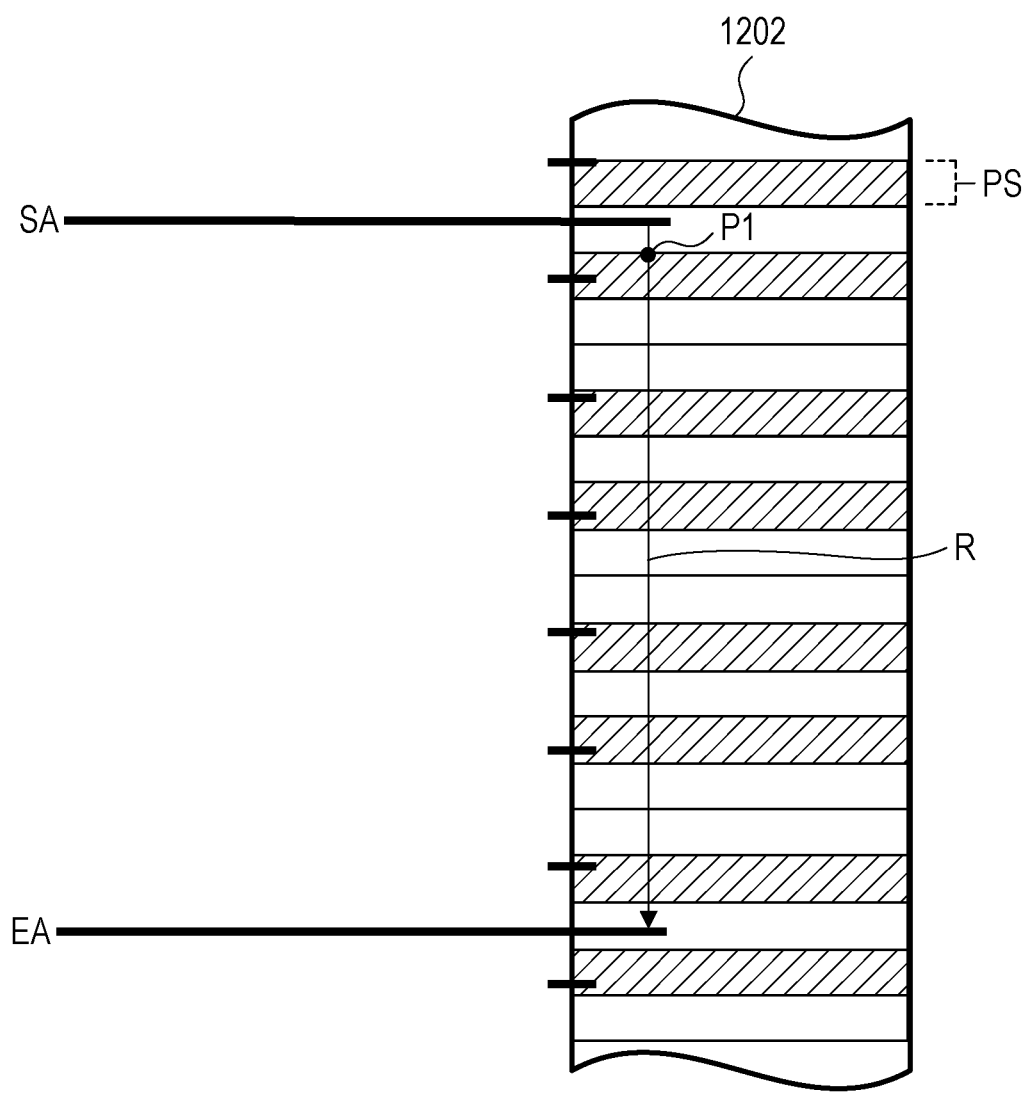
FIG. 20 is a diagram illustrating a sixth state of the memory-mapped address space.

FIG. 20 illustrates a sixth state of the memory-mapped address space 1202. In the sixth state, the pointer P1 reaches an initial monitoring region and the control signal 1204 is generated. Thus, the signal handler 1205 interrupts the process of the deep learning process 1201 and records the current time as time t1.

Figure 21:
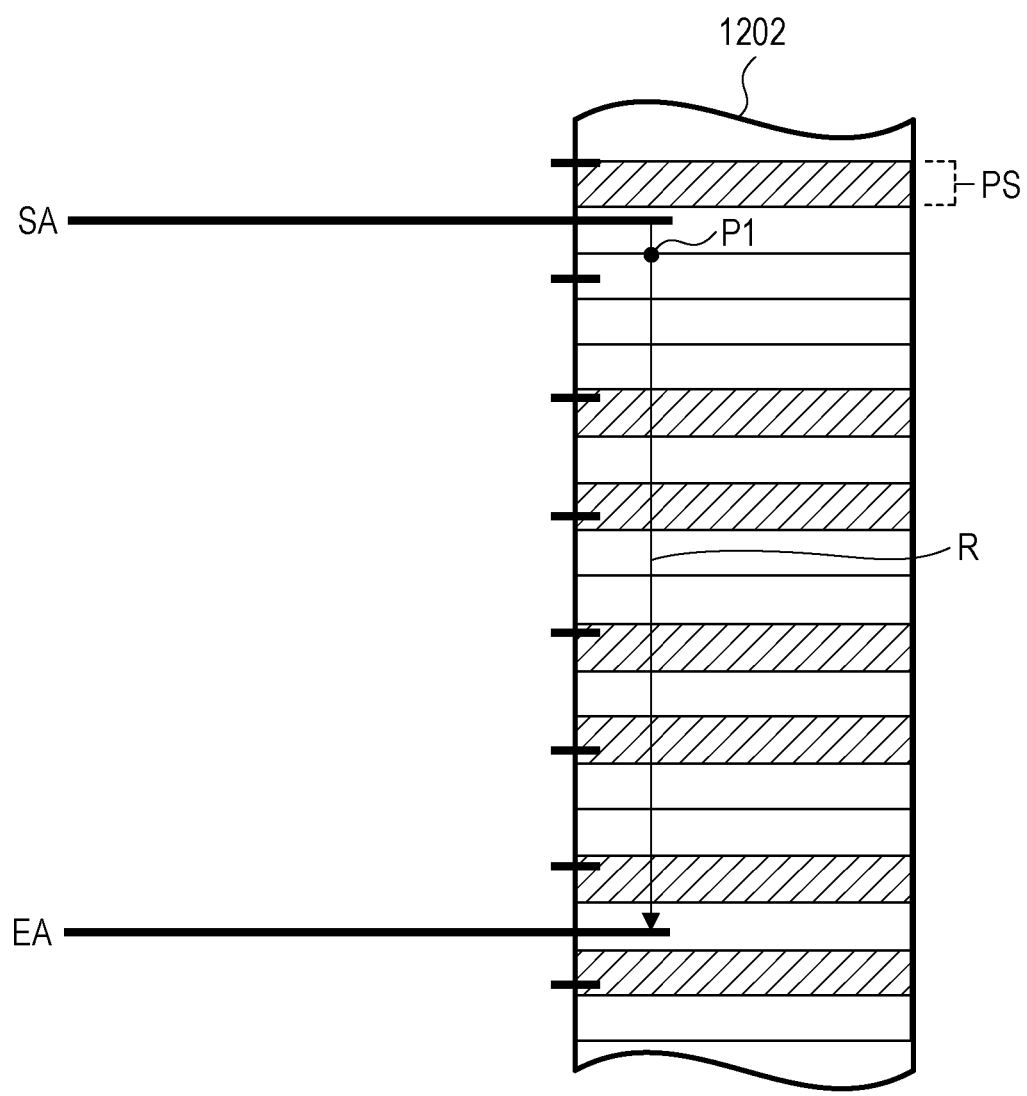
FIG. 21 is a diagram illustrating a seventh state of the memory-mapped address space.

FIG. 21 illustrates a seventh state of the memory-mapped address space 1202. In the seventh state, the signal handler 1205 identifies, based on the control signal 1204, the monitoring region that the pointer P1 has reached, and the signal handler 1205 cancels the protection of the identified monitoring region. In FIG. 21, oblique lines for the monitoring region contacted by the pointer P1 are deleted.

Figure 22:
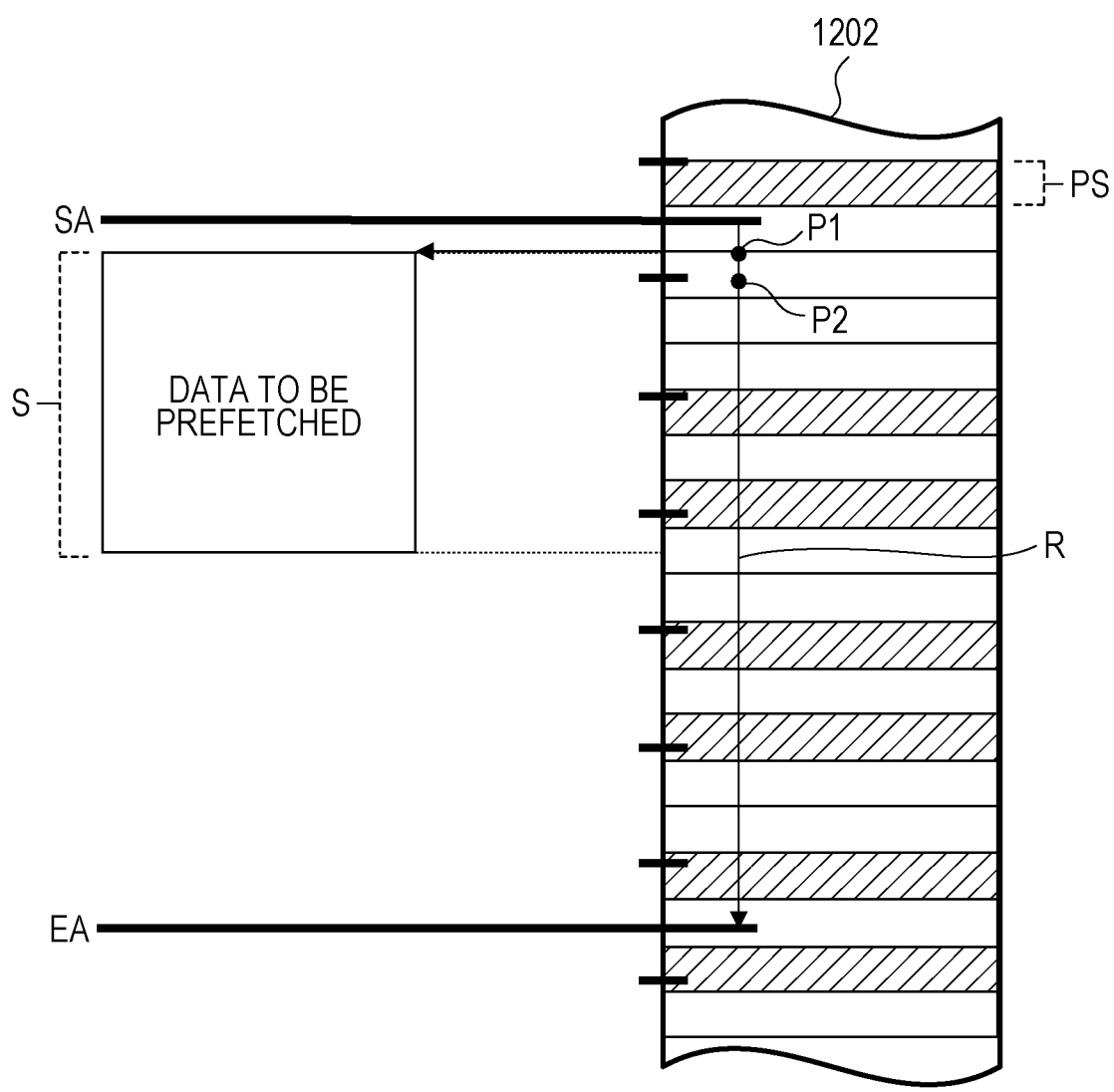
FIG. 22 is a diagram illustrating an eighth state of the memory-mapped address space.

FIG. 22 illustrates an eighth state of the memory-mapped address space 1202. In the eighth state, the signal handler 1205 transfers, to the controller 1004-*i*, a protection cancellation notification including a virtual address of the monitoring region that the pointer P1 has reached, and the signal handler 1205 restarts the process of the deep learning process 1201.

As the virtual address included in the protection cancellation notification, a virtual address of a given position within the monitoring region is used. The given position may be the top of the monitoring region, the end of the monitoring region, or a check point CP included in the monitoring region.

Since the virtual address included in the protection cancellation notification corresponds to the initial monitoring region, the controller 1004-*i* determines that the prefetching is to be activated, and the controller 1004-*i* estimates an address range to be accessed next by the deep learning process 1201. In this example, since the deep learning process 1201 continuously accesses the data of the range R, the controller 1004-*i* determines, as the address range to be accessed next, an address range ranging from the virtual address pointed by the pointer P1 and corresponding to data, to be prefetched, of the size S.

Next, the controller 1004-*i* transfers, to the input and output process 1206, a prefetch instruction to activate the prefetching of partial data of the address range. The input and output process 1206 starts, based on the prefetch instruction, an operation of continuously prefetching the data to be prefetched.

Figure 23:
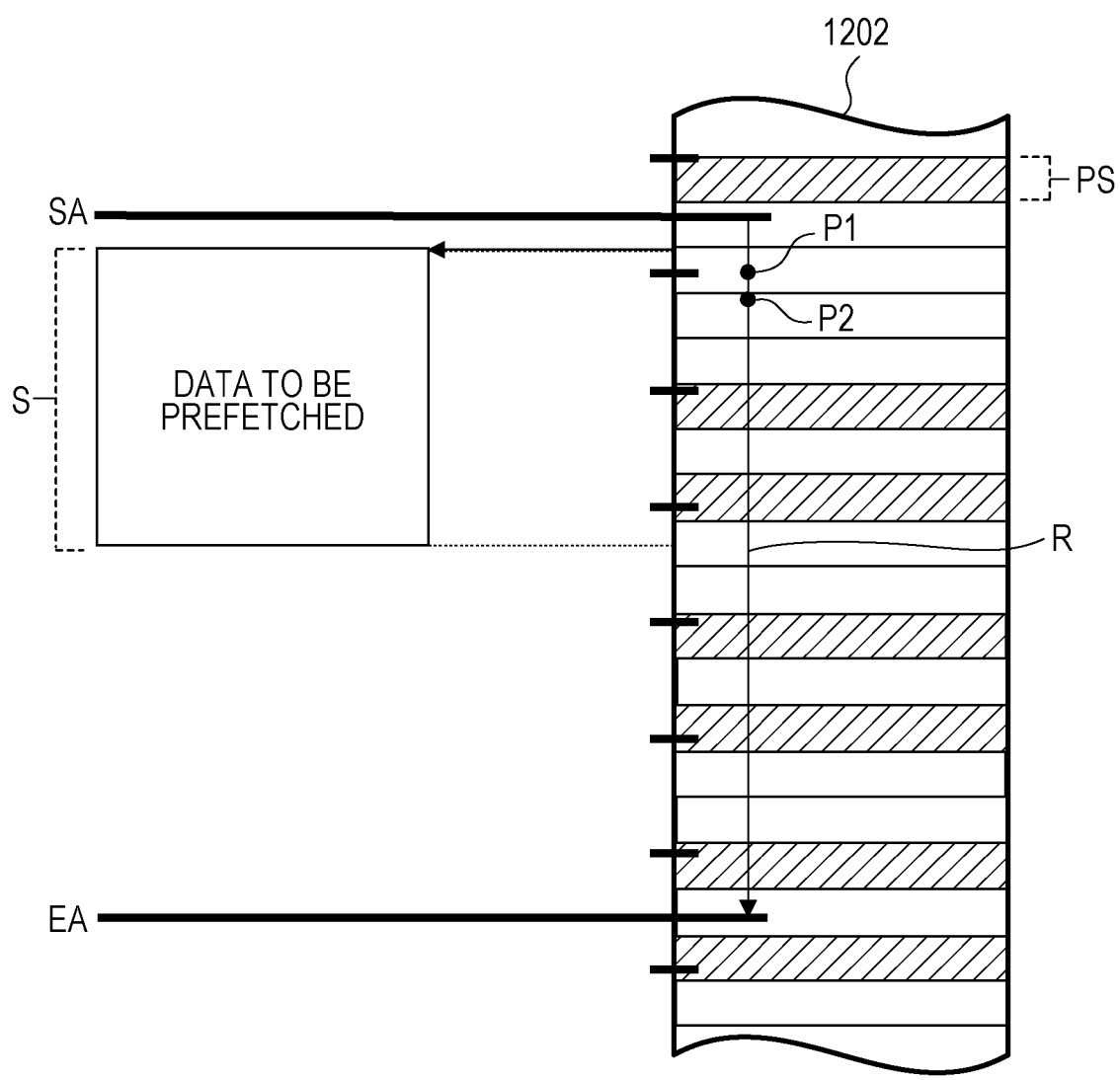
FIG. 23 is a diagram illustrating a ninth state of the memory-mapped address space.

FIG. 23 illustrates a ninth state of the memory-mapped address space 1202. In the ninth state, the input and output process 1206 continues to prefetch the data to be prefetched. A pointer P2 points a virtual address of data currently prefetched by the input and output process 1206. The deep learning process 1201 continues to execute the deep learning using prefetched data corresponding to the pointer P1.

Figure 24:
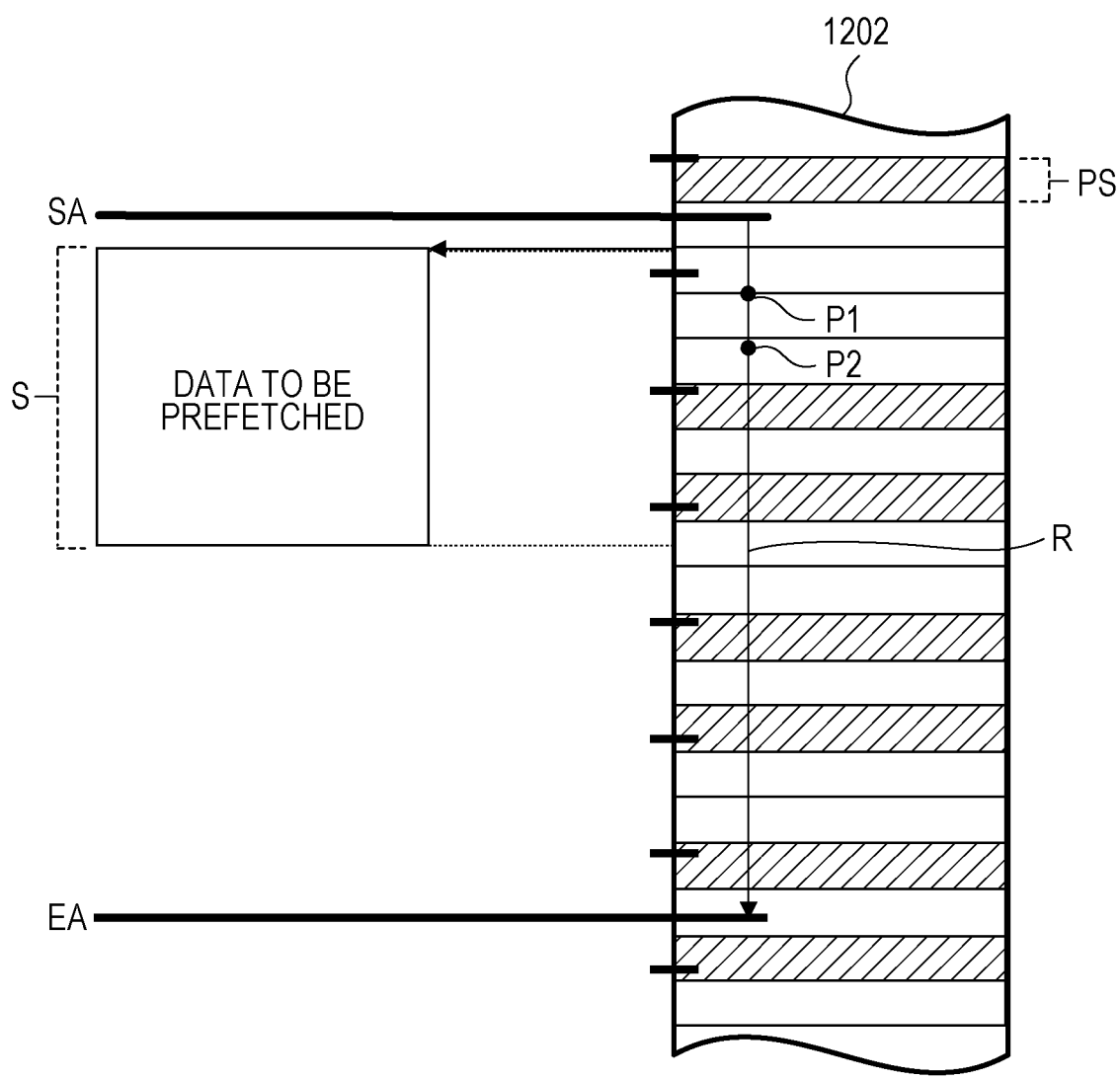
FIG. 24 is a diagram illustrating a tenth state of the memory-mapped address space.

FIG. 24 illustrates a tenth state of the memory-mapped address space 1202. In the tenth state, the input and output process 1206 continues to prefetch the data corresponding to the pointer P2, and the deep learning process 1201 continues to execute the deep learning using the data corresponding to the pointer P1.

Figure 25:
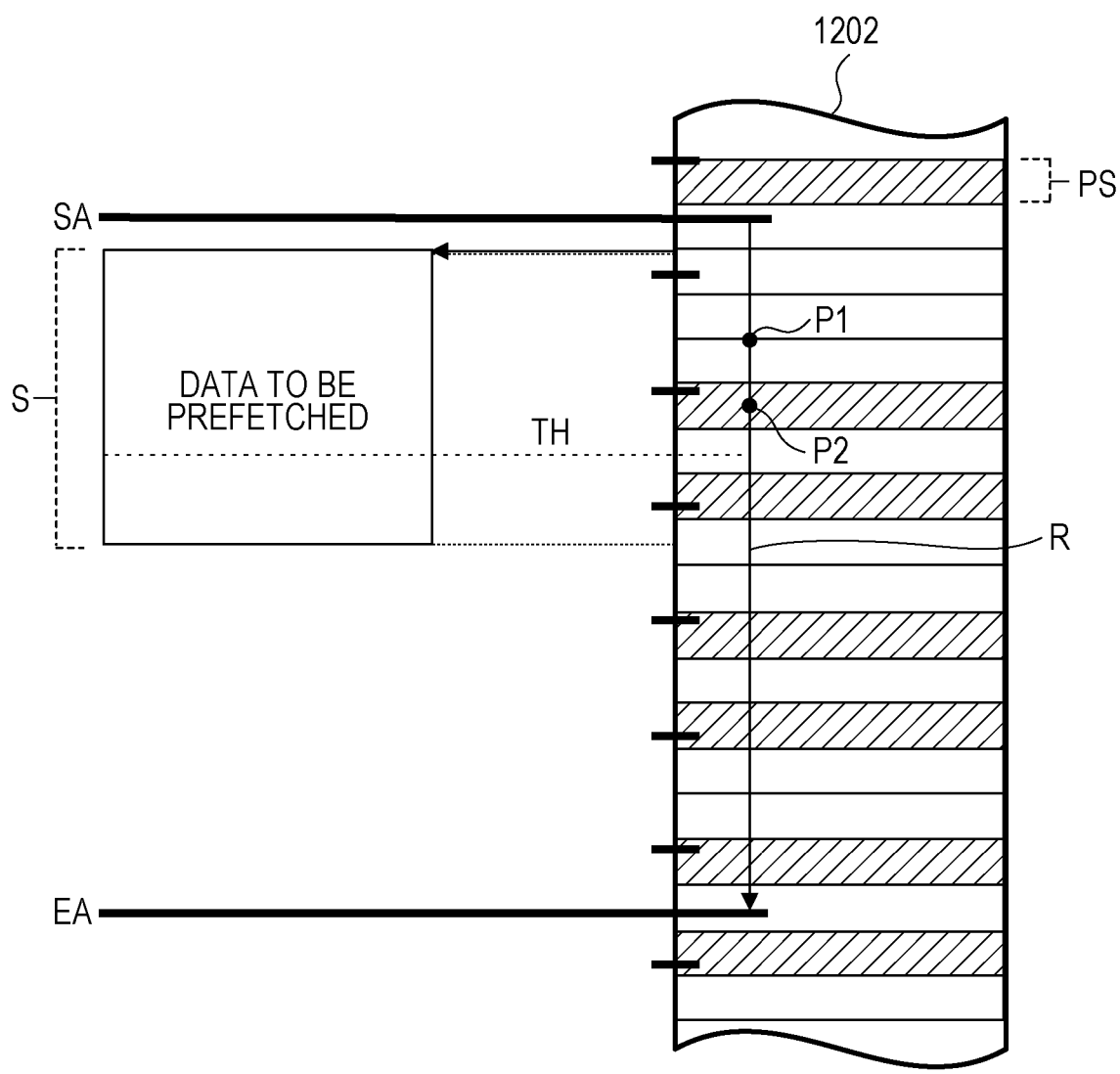
FIG. 25 is a diagram illustrating an eleventh state of the memory-mapped address space.

FIG. 25 illustrates an eleventh state of the memory-mapped address space 1202. In the eleventh state, the pointer P2 reaches the next monitoring region and the control signal 1204 is generated. Thus, the signal handler 1205 interrupts the process of the deep learning process 1201.

Figure 26:
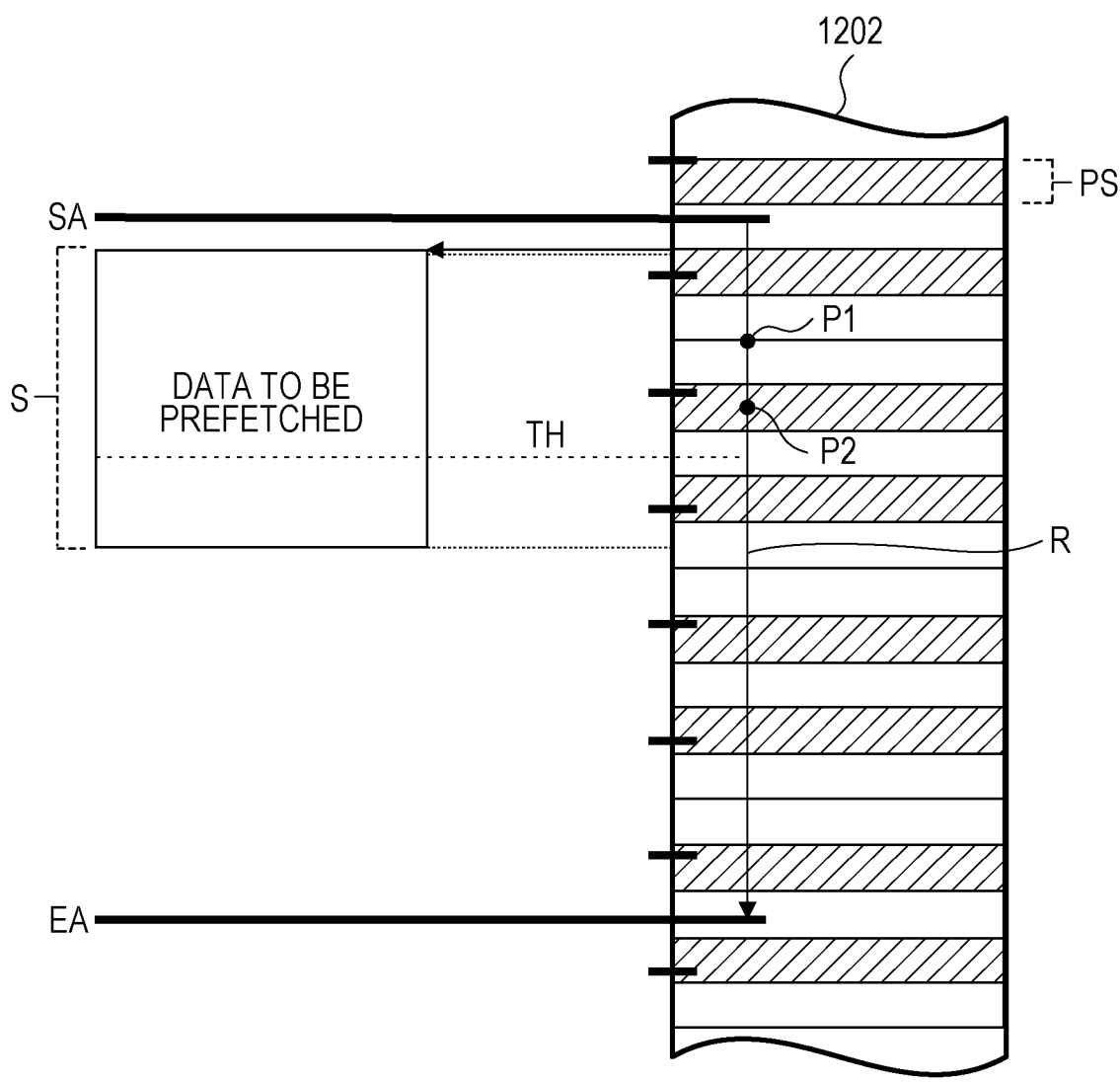
FIG. 26 is a diagram illustrating a twelfth state of the memory-mapped address space.

FIG. 26 illustrates a twelfth state of the memory-mapped address space 1202. In the twelfth state, due to the generation of the control signal 1204, the signal handler 1205 resets protection on the initial monitoring region for which the protection has been canceled.

Figure 27:
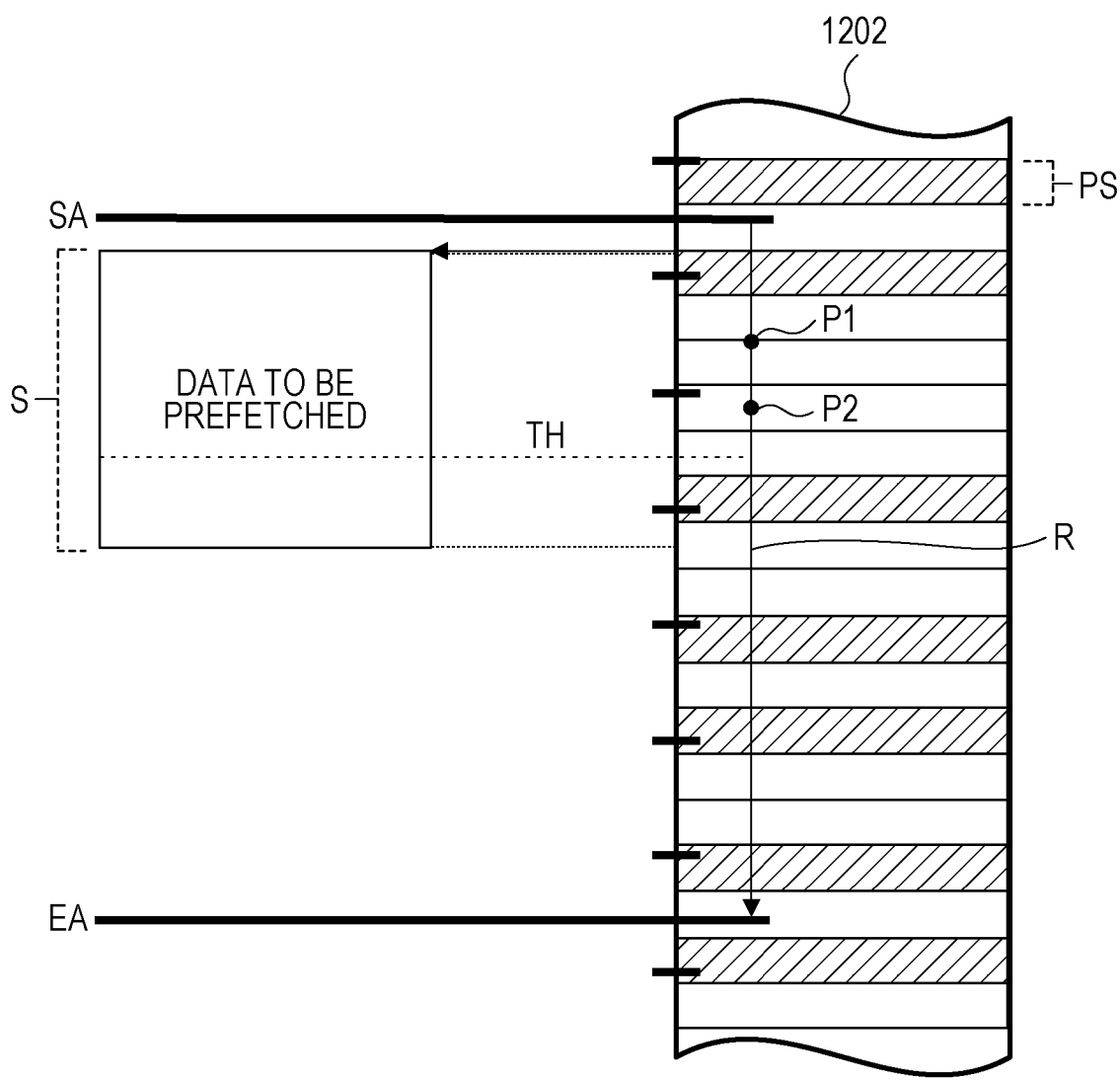
FIG. 27 is a diagram illustrating a thirteenth state of the memory-mapped address space.

FIG. 27 illustrates a thirteenth state of the memory-mapped address space 1202. In the thirteenth state, the signal handler 1205 identifies, based on the control signal 1204, the monitoring region that the pointer P2 has reached, and the signal handler 1205 cancels the protection of the identified monitoring region. Then, the signal handler 1205 transfers, to the controller 1004-$i$, a protection cancellation notification including a virtual address of the monitoring region that the pointer P2 has reached, and the signal handler 1205 restarts the process of the deep learning process 1201.

In this case, since the virtual address included in the protection cancellation notification is included in an address range of an activated prefetching operation but does not reach the virtual address corresponding to the threshold TH, the controller 1004-$i$ does not activate prefetching.

Figure 28:
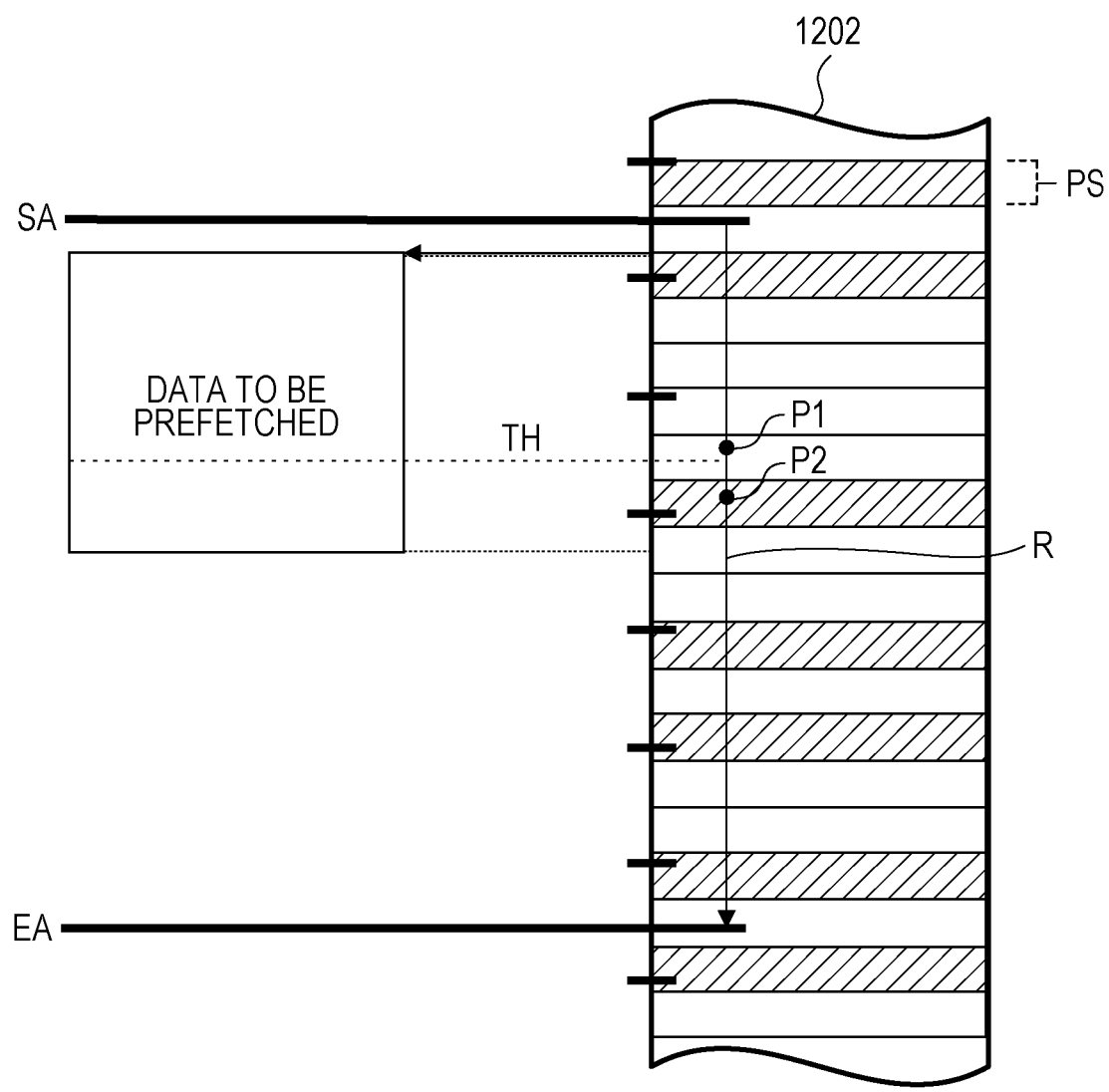
FIG. 28 is a diagram illustrating a fourteenth state of the memory-mapped address space.

FIG. 28 illustrates a fourteenth state of the memory-mapped address space 1202. In the fourteenth state, the pointer P2 reaches the next monitoring region and the control signal 1204 is generated. Thus, the signal handler 1205 interrupts the process of the deep learning process 1201.

In this case, the monitoring region that the pointer P2 has reached is the last monitoring region of the address range corresponding to the data, to be prefetched, of the size S. Thus, the signal handler 1205 records the current time as time t2 and calculates a memory access time period t by subtracting the time t1 from the time t2. The memory access time period t may be used as an index indicating the memory access speed.

Figure 29:
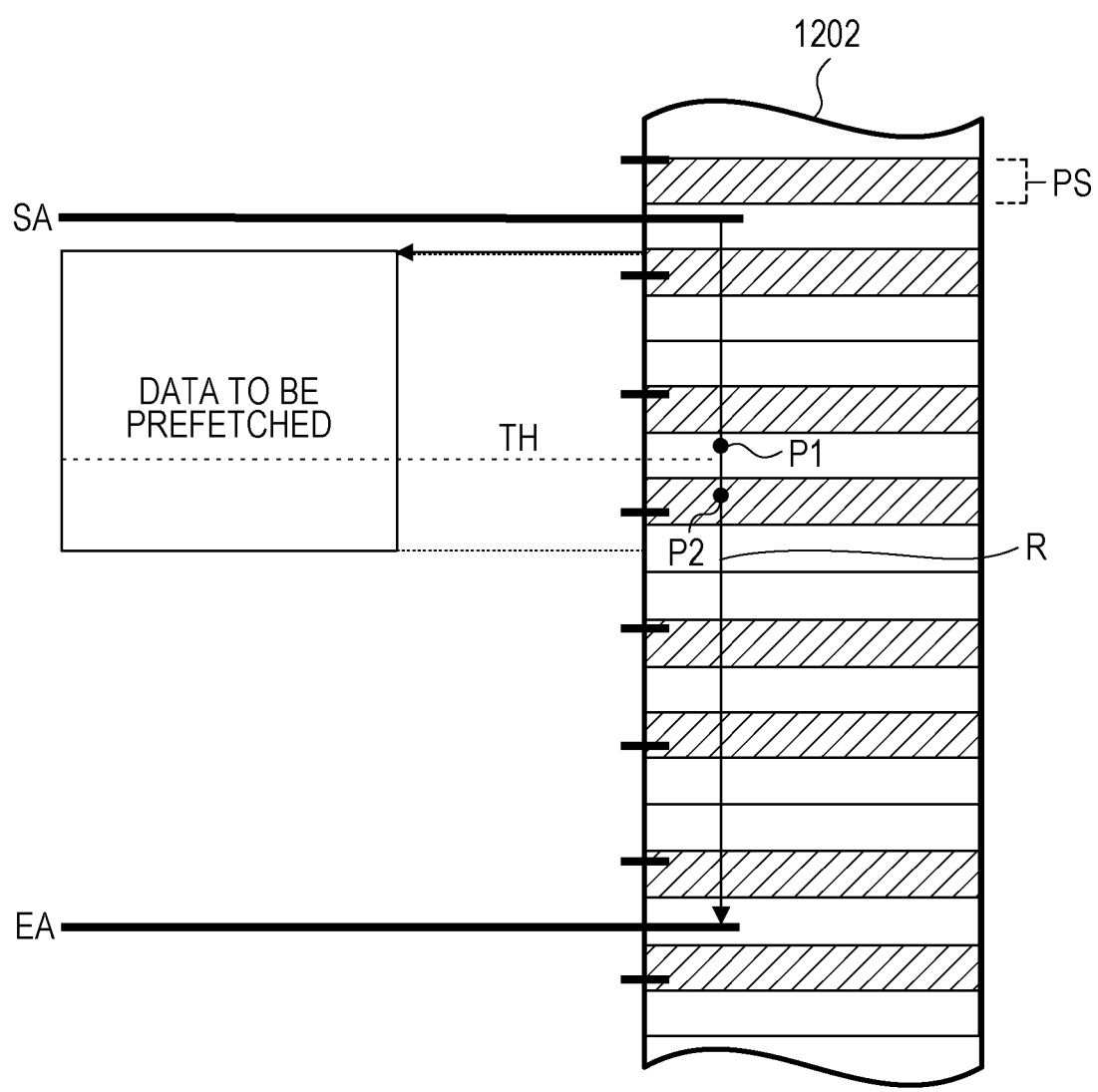
FIG. 29 is a diagram illustrating a fifteenth state of the memory-mapped address space.

FIG. 29 illustrates a fifteenth state of the memory-mapped address space 1202. In the fifteenth state, due to the generation of the control signal 1204, the signal handler 1205 resets protection on the monitoring region for which the protection has been previously canceled.

Figure 30:
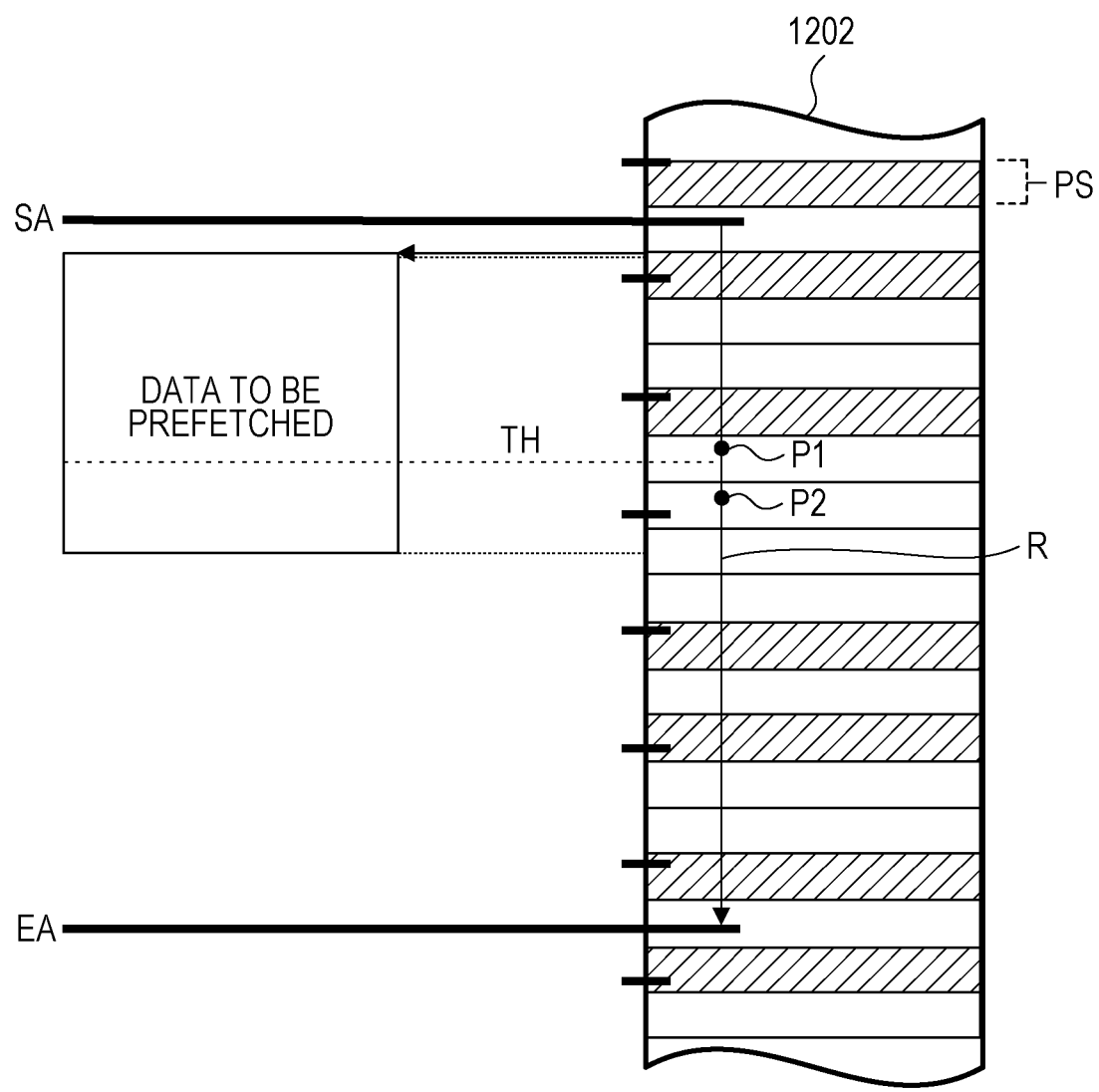
FIG. 30 is a diagram illustrating a sixteenth state of the memory-mapped address space.

FIG. 30 illustrates a sixteenth state of the memory-mapped address space 1202. In the sixteenth state, the signal handler 1205 identifies, based on the control signal 1204, the monitoring region that the pointer P2 has reached, and the signal handler 1205 cancels the protection of the identified monitoring region.

Figure 31:
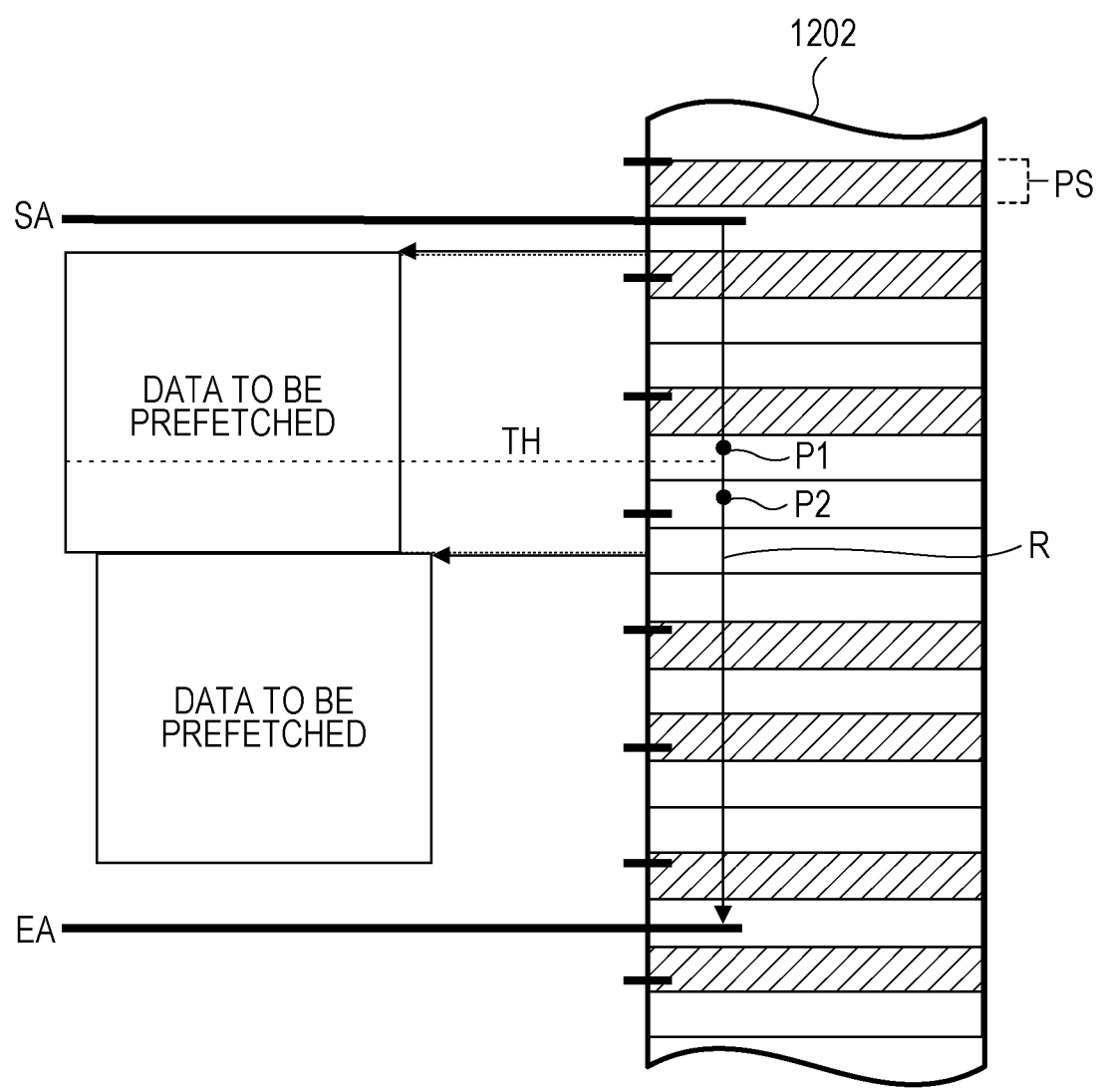
FIG. 31 is a diagram illustrating a seventeenth state of the memory-mapped address space.

FIG. 31 illustrates a seventeenth state of the memory-mapped address space 1202. In the seventeenth state, the signal handler 1205 transfers, to the controller 1004-$i$, a protection cancellation notification including a virtual address of the monitoring region that the pointer P2 has reached, and the signal handler 1205 restarts the process of the deep learning process 1201.

In this case, since the virtual address included in the protection cancellation notification is included in the address range of the activated prefetching operation and exceeds the virtual address corresponding to the threshold TH, the controller 1004-$i$ determines that prefetching is to be activated. Then, the controller 1004-$i$ determines, as an address range to be accessed next, an address range ranging from the end of the address range of the activated prefetching operation and corresponding to data, to be prefetched, of the size S.

Next, the controller 1004-$i$ transfers, to the input and output process 1206, a prefetch instruction to activate the prefetching of partial data of the address range. The input and output process 1206 starts, based on the prefetch instruction, an operation of continuously prefetching the data to be prefetched next.

The threshold TH indicates a data amount of the size S or less but is preferably set to satisfy the following Inequality (1).

$$G \leq S - TH \tag{1}$$

G of Inequality (1) indicates an interval obtained by converting the distance D in the virtual address space to the data amount. If the threshold TH satisfies Inequality (1), one or more check points CP exist between the virtual address corresponding to the threshold TH and a virtual address corresponding to the end of the data to be prefetched. Thus, the control signal 1204 is generated before data of the end of the data to be prefetched is prefetched, and the next prefetching may be activated before the completion of an activated prefetching operation.

Next, an example of results of an experiment based on the control process illustrated in FIG. 13 is described with reference to FIGS. 32 to 36. In this experiment, monitoring regions are protected using mprotect, and the SIGSEGV signal is used as the control signal 1204.

Figure 32:
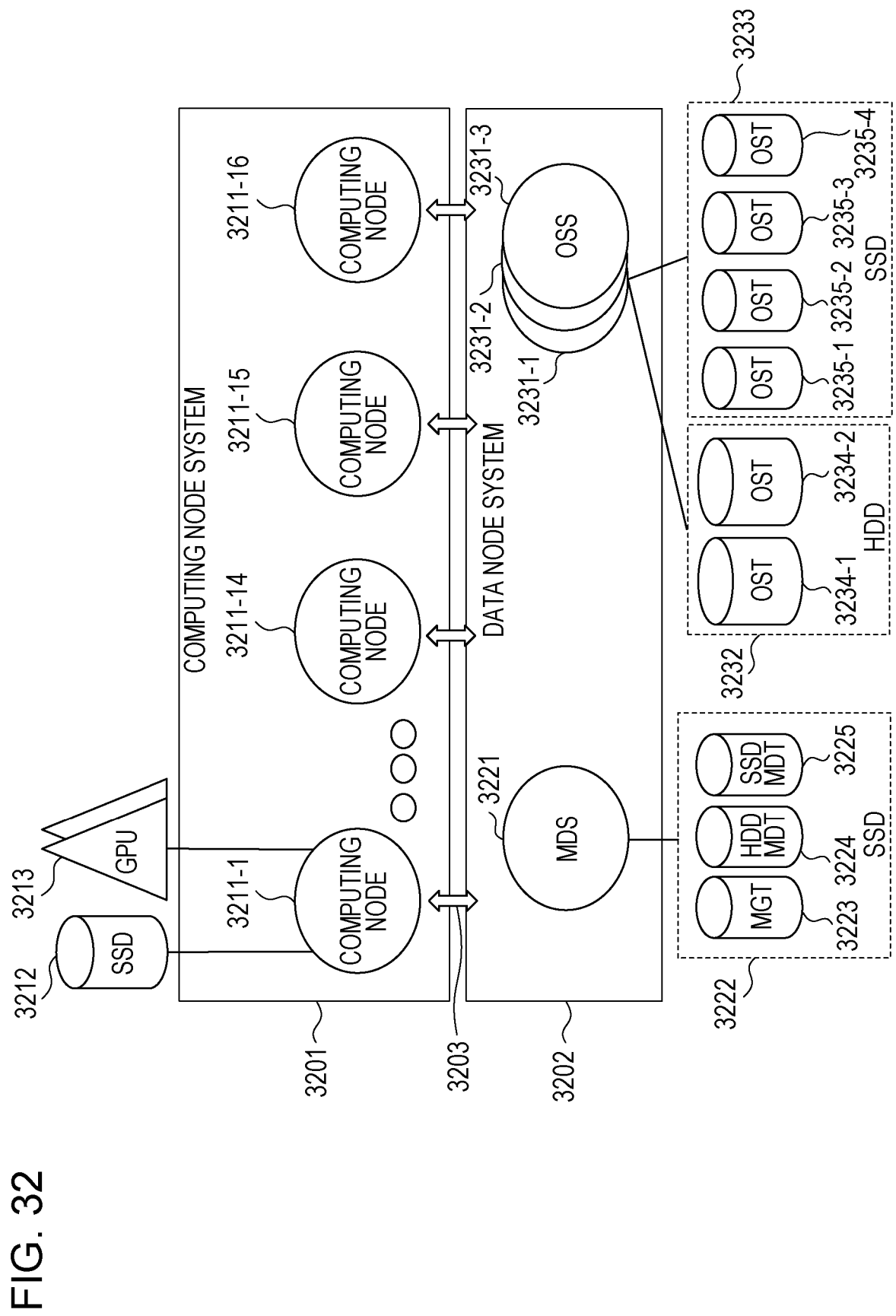
FIG. 32 is a configuration diagram of an HPC parallel file system used in an experiment.

FIG. 32 illustrates an example of the configuration of an HPC parallel file system used in the experiment. The HPC parallel file system illustrated in FIG. 32 includes a computing node system 3201 and a data node system 3202. The computing node system 3201 and the data node system 3202 are connected to each other by InfiniBand 3203.

The computing node system 3201 includes computing nodes 3211-1 to 3211-16 and executes MPI-Caffe. The data node system 3202 is Fujitsu Exabyte File System (FEFS) (trademark) and includes a meta data server (MDS) 3221 and object storage servers (OSSs) 3231-1 to 3231-3. The computing nodes 3211-$i$ ($i$=1 to 16) correspond to the computing nodes 901-$i$ illustrated in FIG. 9, while the OSSs 3231-$j$ ($j$=1 to 3) correspond to the data nodes 902-$j$.

Each of the computing nodes 3211-$i$ includes a solid state drive (SSD) 3212 and a graphics processing unit (GPU) 3213. The SSDs 3212 are used as the memories 1001-$i$ illustrated in FIG. 10, while the GPUs 3213 are used as the processing sections 1002-$i$.

Each of the OSSs 3231-$j$ includes a hard disk drive (HDD) 3232 and an SSD 3233. The HDDs 3232 and the SSDs 3233 are used as the memories (storage sections) 1101-$j$ illustrated in FIG. 11. Each of the HDDs 3232 stores object storage targets (OSTs) 3234-1 and 3234-2, while each of the SSDs 3233 stores OSTs 3235-1 to 3235-4. The OSTs 3234-1, 3234-2, and 3235-1 to 3235-4 correspond to the data to be processed.

The MDS 3221 includes an SSD 3222 that stores a management target (MGT) 3223, an HDD meta data target (MDT) 3224, and an SSD MDT 3225. The MGT 3223, the HDD MDT 3224, and the SSD MDT 3225 are management information for the OSTs 3234-1, 3234-2, and 3235-1 to 3235-4.

Figure 33:
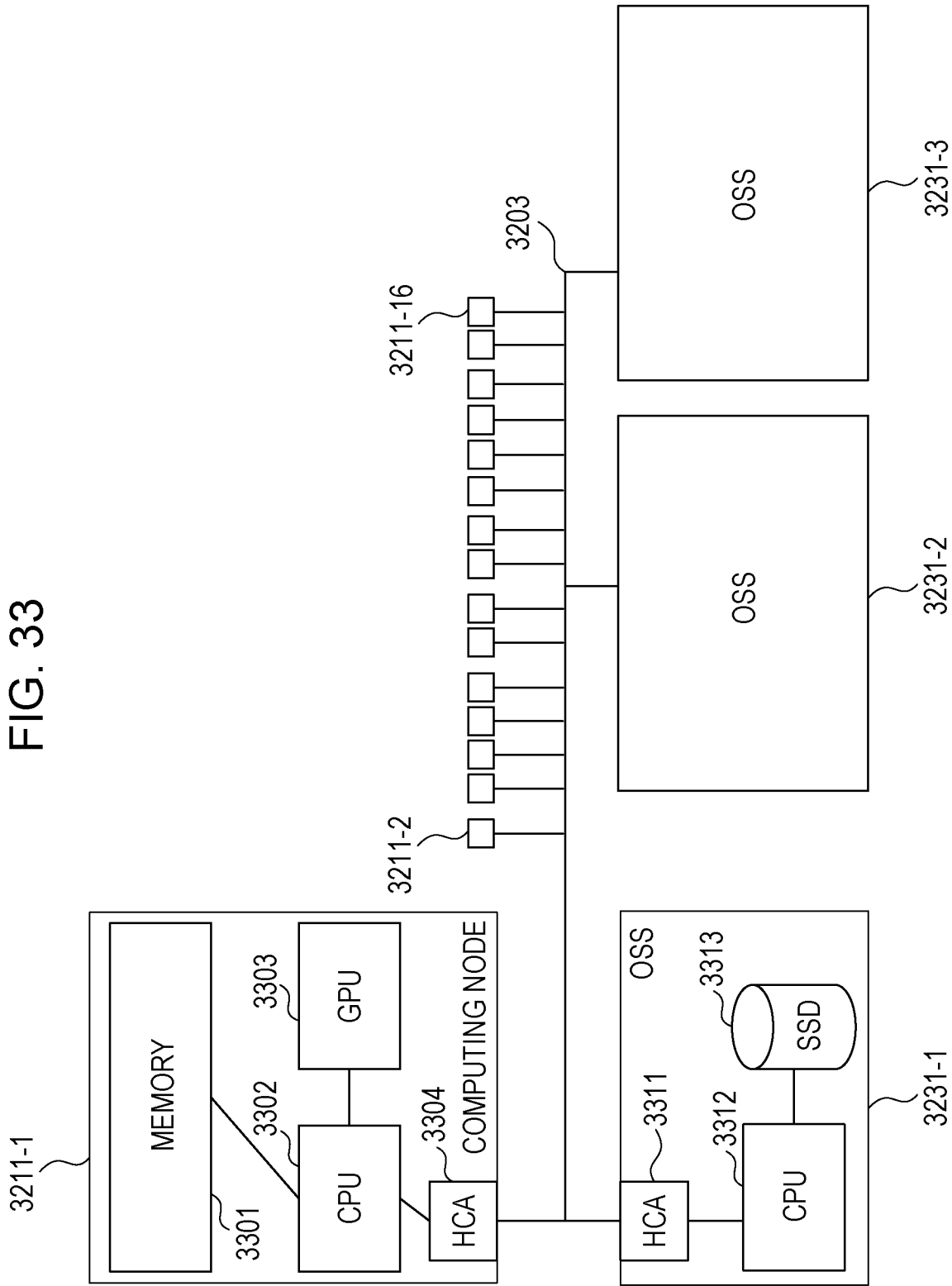
FIG. 33 is a configuration diagram illustrating computing nodes and OSSs.

FIG. 33 illustrates an example of a configuration including the computing nodes 3211-$i$ illustrated in FIG. 32 and the OSSs 3231-$j$ illustrated in FIG. 32. Each of the computing nodes 3211-$i$ illustrated in FIG. 33 includes a memory 3301, a central processing unit (CPU) 3302, a GPU 3303, and a host channel adapter (HCA) 3304. The GPUs 3303 correspond to the GPUs 3213 illustrated in FIG. 32. The memories 3301 are used as the memories 1001-$i$ illustrated in FIG.

10, while the CPUs 3302 are used as the processing sections 1002-$i$, the monitoring sections 1003-$i$, and the controllers 1004-$i$. The HCAs 3304 communicate with the OSSs 3231-1 to 3231-3 via InfiniBand 3203.

Each of the OSSs 3231-$j$ includes an HCA 3311, a CPU 3312, and an SSD 3313. The SSDs 3313 correspond to the SSDs 3233 illustrated in FIG. 32. The CPUs 3312 are used as the controllers 1102-$j$ illustrated in FIG. 11. The HCAs 3311 communicate with the computing nodes 3211-1 to 3211-16 via InfiniBand 3203.

Figure 34:
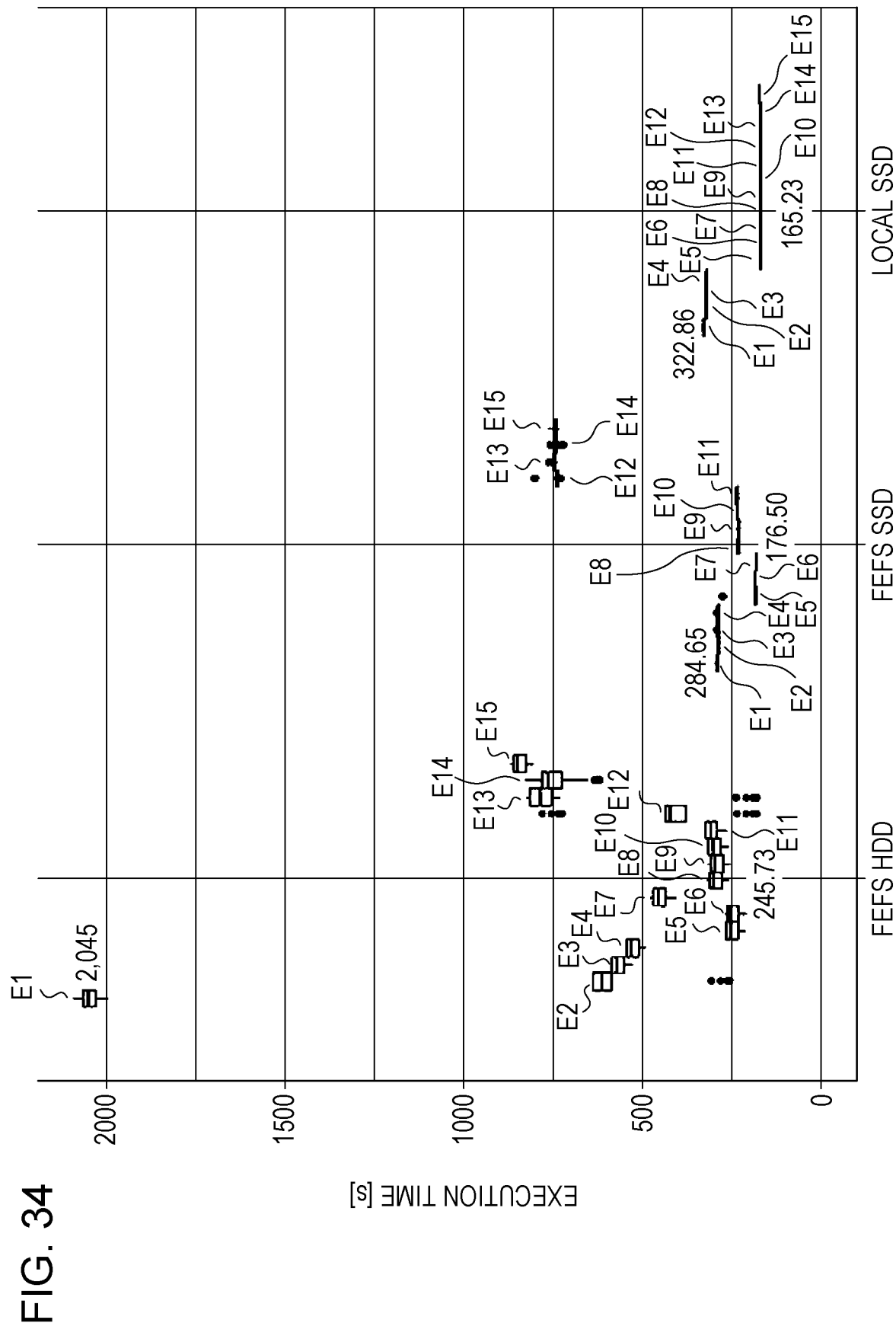
FIG. 34 is a diagram illustrating results of executing distributed deep learning.

FIG. 34 illustrates an example of results of executing distributed deep learning by the HPC parallel file system illustrated in FIGS. 32 and 33. In FIG. 34, an abscissa indicates different configurations of storage devices storing the data to be processed, while an ordinate indicates execution time of the distributed deep learning.

FEFS HDD indicated on the abscissa indicates a configuration in which the HDDs 3232 illustrated in FIG. 32 are used instead of the SSDs 3313 illustrated in FIG. 33, while FEFS SSD indicated on the abscissa indicates the configuration illustrated in FIG. 33. Local SSD indicated on the abscissa indicates a configuration in which the data to be processed is stored in the SSDs 3212 of the computing nodes 3211-$i$ illustrated in FIG. 32, instead of the OSSs 3231-1 to 3231-3.

E1 of the configurations indicates results of executing the distributed deep learning without the application of the control process illustrated in FIG. 13. Thus, in the distributed deep learning resulting in E1, prefetching is not executed. In addition, E2 to E15 indicate results of executing the distributed deep learning in the case where the control process illustrated in FIG. 13 is applied and prefetching is executed in a state in which intervals G and sizes S vary. The intervals G and sizes S when the execution results E2 to E15 are obtained are as follows. MB stands for megabyte.

E2 is obtained in the case where G=8 MB and S=8 MB. E3 is obtained in the case where G=8 MB and S=10 MB. E4 is obtained in the case where G=10 MB and S=10 MB. E5 is obtained in the case where G=8 MB and S=50 MB. E6 is obtained in the case where G=10 MB and S=50 MB. E7 is obtained in the case where G=32 MB and S=50 MB. E8 is obtained in the case where G=8 MB and S=128 MB. E9 is obtained in the case where G=10 MB and S=128 MB. E10 is obtained in the case where G=32 MB and S=128 MB. E11 is obtained in the case where G=128 MB and S=128 MB. E12 is obtained in the case where G=8 MB and S=512 MB. E13 is obtained in the case where G=32 MB and S=512 MB. E14 is obtained in the case where G=128 MB and S=512 MB. E15 is obtained in the case where G=512 MB and S=512 MB.

The threshold TH is set to 75% of the size S. The execution results indicate distribution ranges of the execution time of the distributed deep learning executed a given number of times and include transverse lines indicating average values and rectangles indicating standard deviations. For example, the longest execution time among average values of FEFS HDD is 2045 seconds indicated by E1, while the shortest execution time among the average values of FEFS HDD is 245.73 seconds indicated by E6.

The longest execution time among average values of FEFS SSD is 284.65 seconds indicated by E1, while the shortest execution time among the average values of FEFS SSD is 176.50 seconds indicated by E7. In addition, the longest execution time among average values of local SSD is 322.86 seconds indicated by E1, while the shortest execution time among the average values of local SSD is 165.23 seconds.

Figure 35:
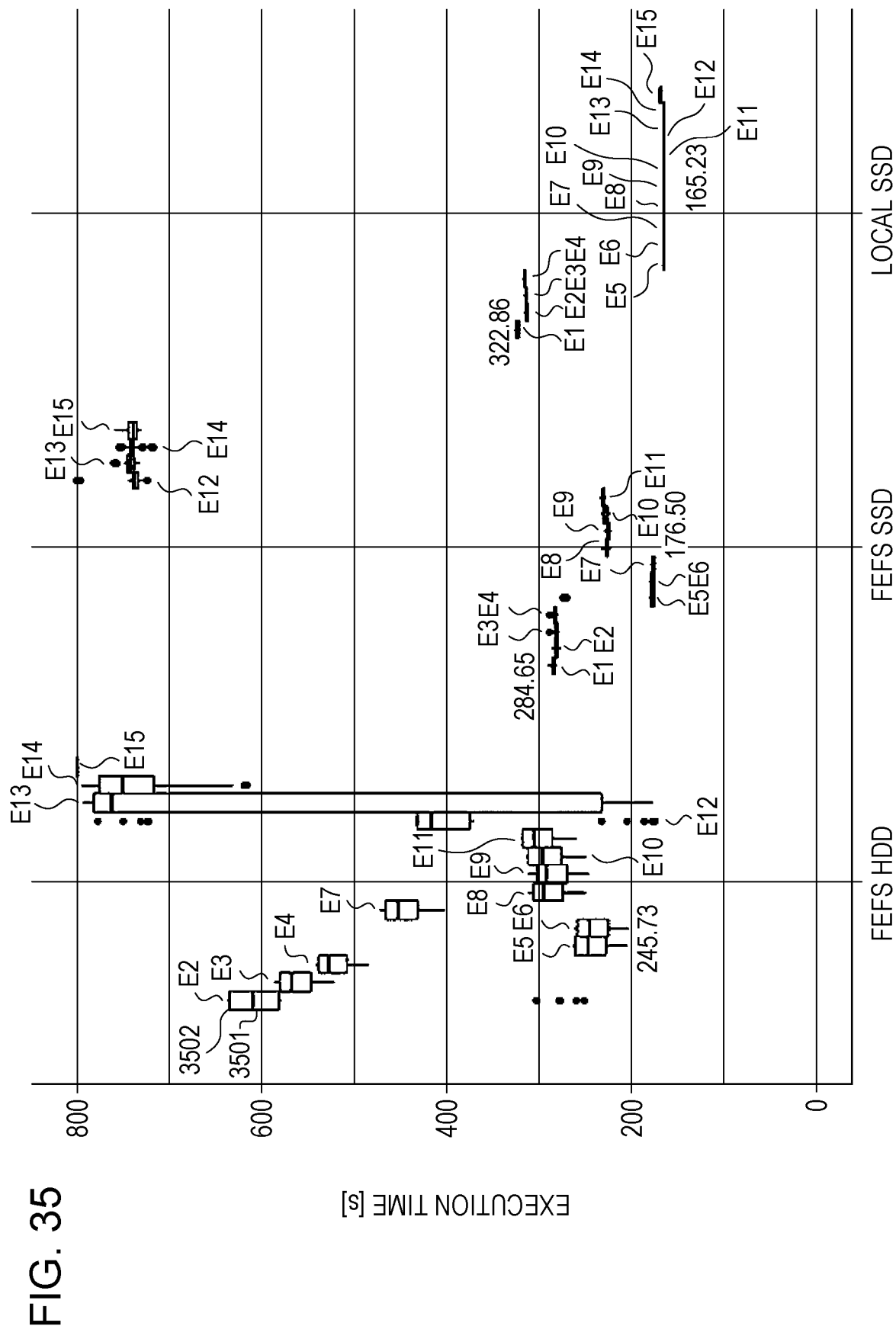
FIG. 35 is an enlarged diagram of the execution results.

FIG. 35 is an enlarged diagram of the execution results illustrated in FIG. 34. For example, in the execution results E2 of FEFS HDD, a transverse line 3501 indicates an average value of execution time, and a rectangle 3502 indicates a standard deviation.

In the configurations of the storage devices, the execution results E2 to E15 are more excellent than the execution results E1. The shortest execution time of FEFS HDD is reduced by 87.98%, compared with the execution time indicated by E1, while the shortest execution time of FEFS SSD is reduced by 37.99%, compared with the execution time indicated by E1. In addition, the shortest execution time of local SSD is reduced by 48.82%, compared with the execution time indicated by E1.

Figure 36:
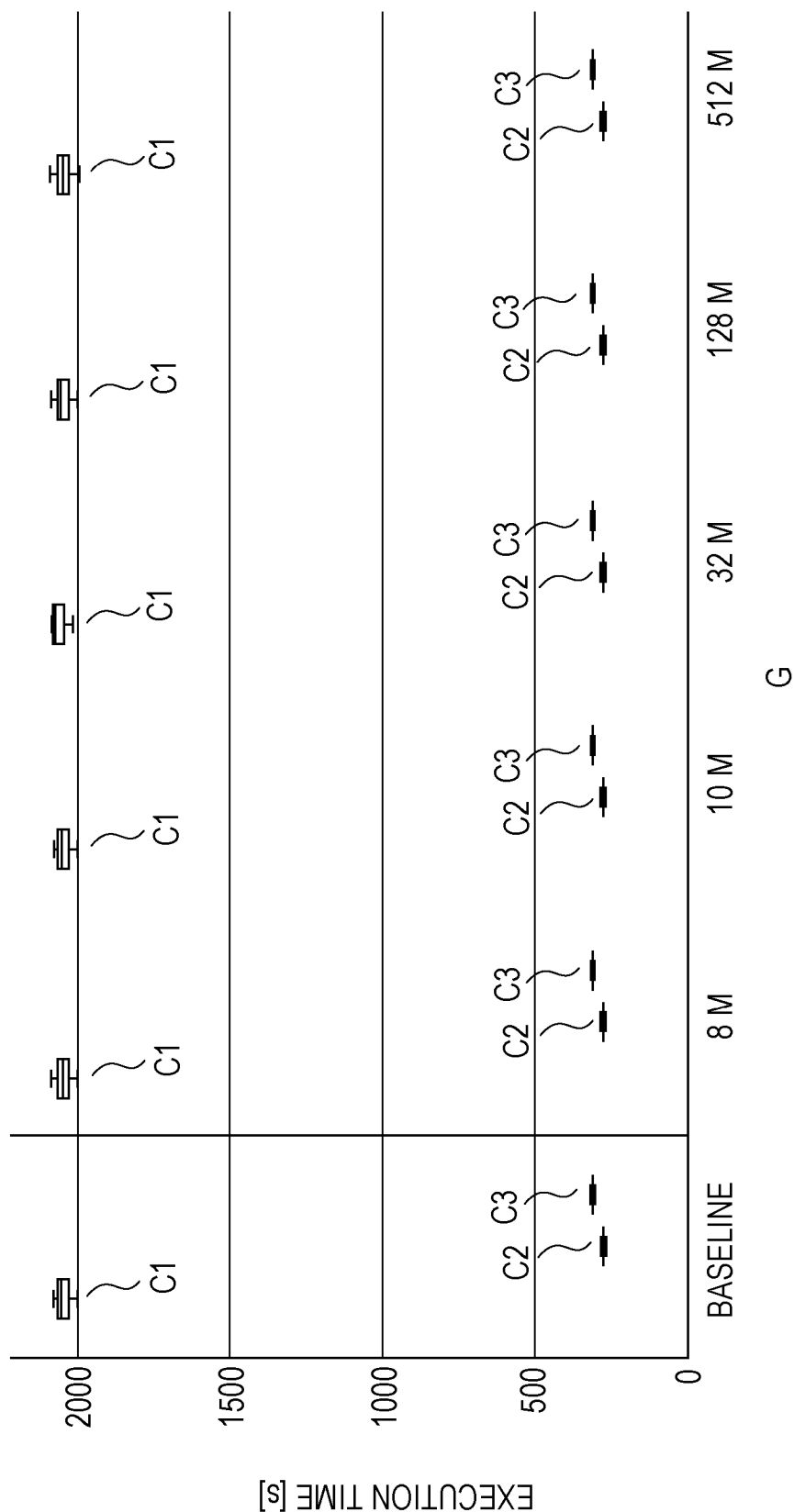
FIG. 36 is a diagram illustrating results of executing distributed deep learning in the case where prefetching is not activated.

FIG. 36 illustrates an example of results of executing the distributed deep learning in the case where prefetching is not activated even upon the generation of the control signal 1204 in the HPC parallel file system illustrated in FIGS. 32 and 33. In this case, the processes of steps 1304 to 1308, 1311 to 1313, and 1325 illustrated in FIG. 13 are omitted.

In FIG. 36, an abscissa indicates intervals G, and an ordinate indicates execution time of the distributed deep learning. Baseline indicated on the abscissa indicates the case where the distributed deep learning is executed without the application of the control process illustrated in FIG. 13. C1 indicates execution results obtained from FEFS HDD, C2 indicates execution results obtained from FEFS SSD, and C3 indicates execution results obtained from local SSD.

According to the execution results illustrated in FIG. 36, the execution time is nearly equal to that obtained in the case indicated by Baseline, regardless of the configurations of the storage devices and values of the intervals G. Thus, it is apparent that overhead caused by the protection of monitoring regions and the detection of the control signal 1204 is small.

The control process illustrated in FIG. 12 is applicable not only to the distributed deep learning but also to another process of using memory mapping to access the data to be processed. Examples of the other process are inter-process communication and memory access profiling.

Figure 37:
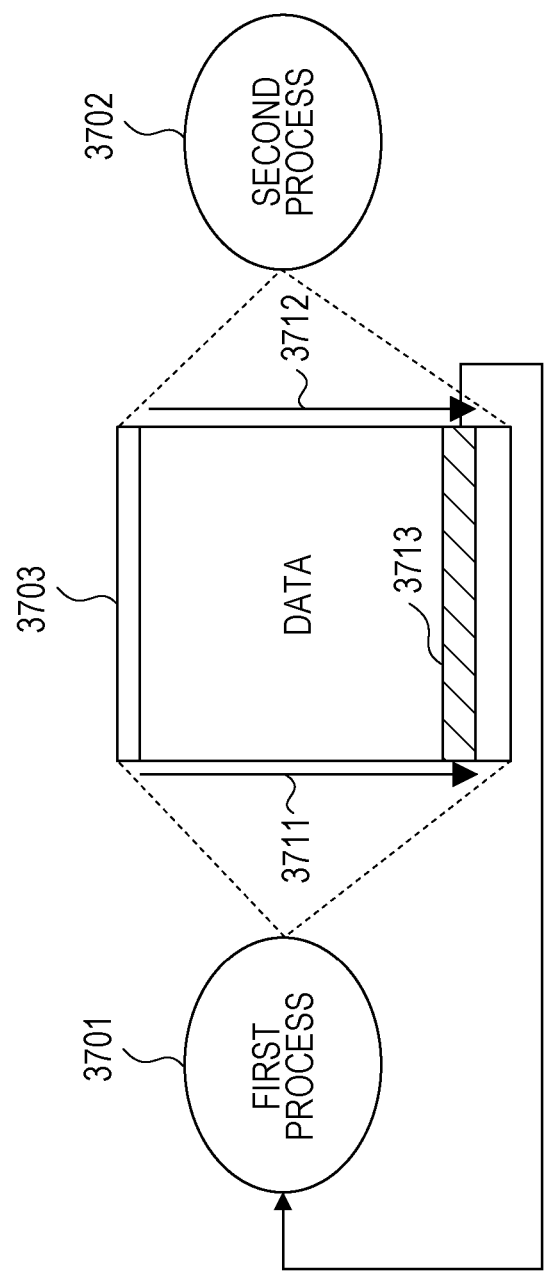
FIG. 37 is a diagram illustrating inter-process communication.

FIG. 37 illustrates an example of the inter-process communication. In inter-process communication illustrated in FIG. 37, data to be transferred from a first process 3701 to a second process 3702 is stored in a shared memory 3702 as the data to be processed. The first process 3701 continuously writes, to the shared memory 3703, the data to be processed as indicated by an arrow 3711 and continuously reads, from the shared memory 3703, the data to be processed as indicated by an arrow 3712.

Then, when the second process 3702 accesses a protected page 3713, the control signal 1204 is generated and the execution of the access to the page 3713 is notified to the first process 3701. In this case, the first process 3701 writes, to the shared memory 3703, data to be read next by the second process 3702.

For example, in the case where the inter-process communication is executed in the information processing device 701 illustrated in FIG. 7, the memory (storage section) 711 is used as the shared memory 3703, the controller 714 controls the first process 3701, and the processing section 712 controls the second process 3702.

Figure 38:
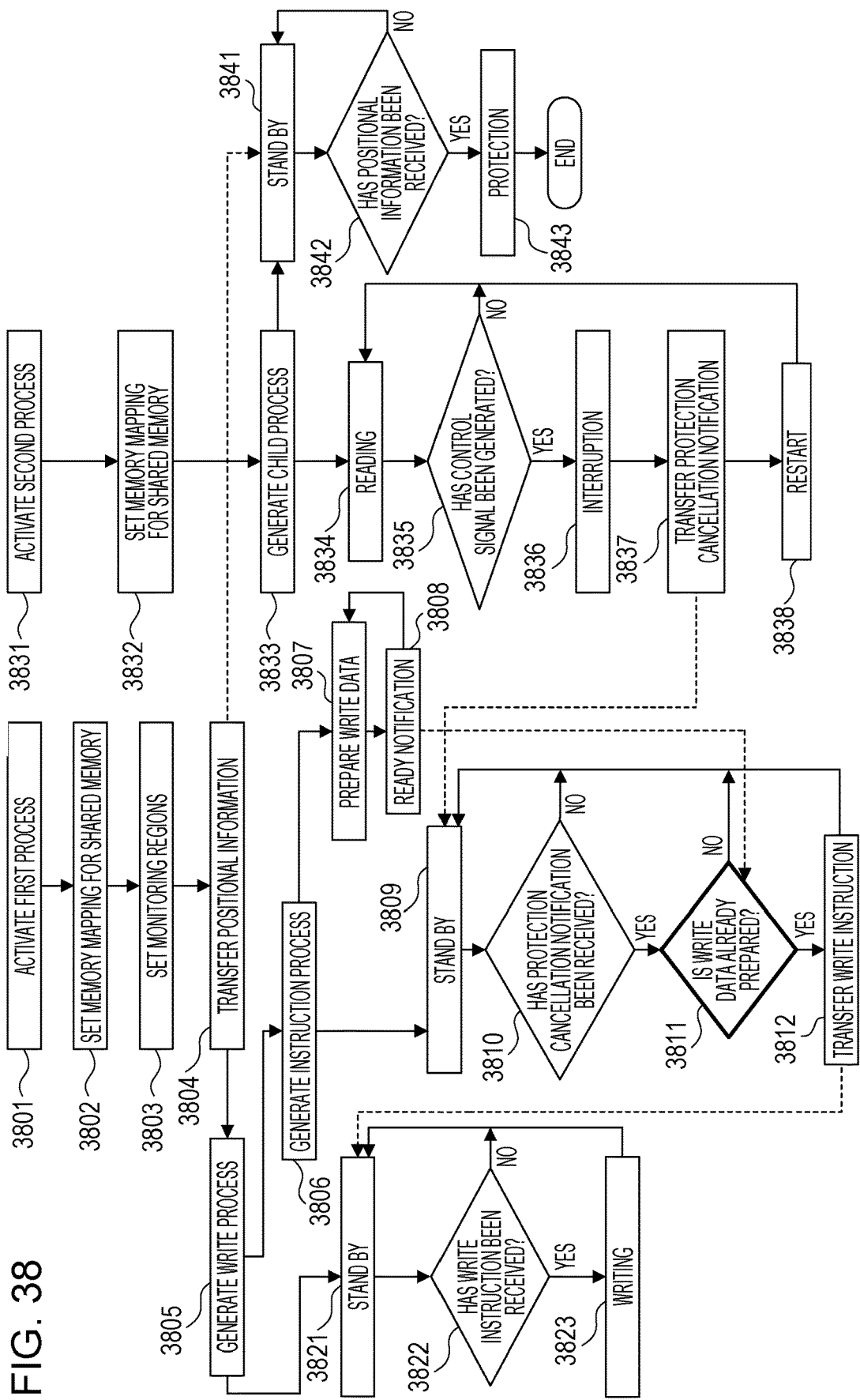
FIG. 38 is a flowchart of a control process in the interprocess communication.

FIG. 38 is a flowchart of a specific example of a control process in the inter-process communication illustrated in FIG. 37. First, the controller 714 activates the first process 3701 (in step 3801) and sets memory mapping for the shared memory 3703 (in step S3802). By executing the processes of steps S3801 and S3802, the memory-mapped address space 1202 illustrated in FIG. 12 is generated.

The processing section 712 activates the second process 3702 and the monitoring section 713 injects an additional code for a monitoring process into a program of the second process 3702 (in step 3831). Then, the processing section 712 sets the same memory mapping as that set in step S3802 for the shared memory (in step 3832).

Next, the monitoring section 713 executes processes of steps 3803, 3804, 3833, 3835 to 3838, and 3841 to 3843. The processes of steps 3833, 3835 to 3838, and 3841 to 3843 are executed based on the injected additional code.

The processing section 712 uses the second process 3702 to execute a process of step 3834, and the controller 714 uses the first process 3701 to execute processes of steps 3805 to 3812 and 3821 to 3823.

The monitoring section 713 generates, based on the additional code, a child process for protecting monitoring regions (in step 3833), and the generated child process executes the processes of steps 3841 to 3843. The processes of steps 3841 to 3843 are the same as or similar to the processes of steps 1331 to 1333 illustrated in FIG. 13.

The monitoring section 713 sets the monitoring regions in the memory-mapped address space 1202 (in step 3803) and transfers, to the child process, positional information indicating the positions of the set monitoring regions (in step 3804).

Next, the first process 3701 generates a write process (in step 3805) and generates an instruction process (in step 3806). Then, the first process 3701 prepares write data to be written to the shared memory 3703 next (in step 3807), transfers a ready notification to the instruction process (in step 3808), and repeats the processes of steps 3807 and 3808.

The write process waits for a write instruction (in step 3821). The write process checks whether or not the write process has received the write instruction from the instruction process (in step 3822). If the write process has not received the write instruction (No in step 3822), the write process repeats the processes of steps 3821 and 3822.

The instruction process waits for a protection cancellation notification from the signal handler 1205 (in step 3809). The instruction process checks whether or not the instruction process has received the protection cancellation notification from the signal handler 1205 (in step 3810). If the instruction process has not received the protection cancellation notification (No in step 3810), the instruction process repeats the processes of steps 3809 and 3810.

The second process 3702 accesses the shared memory 3703 and reads data from the shared memory 3703 (in step 3834). The signal handler 1205 checks whether or not the control signal 1204 indicating a fault has been generated (in step 3835). If the control signal 1204 has not been generated (No in step 3835), the second process 3702 continues to execute the process of step 3834.

On the other hand, if the control signal 1204 has been generated (Yes in step 3835), the signal handler 1205 interrupts the process of the second process 3702 (in step 3836). Then, the signal handler 1205 identifies an accessed monitoring region based on the control signal 1204, cancels the protection of the identified monitoring region, and resets protection on a monitoring region for which protection has been canceled in the past. In this case, the signal handler 1205 may record the time when the control signal 1204 has been generated, and the signal handler 1205 may calculate the memory access speed based on the recorded time.

Next, the signal handler 1205 transfers, to the instruction process, the protection cancellation notification including a virtual address of the monitoring region for which the protection has been cancelled (in step 3837), and the signal handler 1205 restarts the process of the second process 3702 (in step 3838). Then, the second process 3702 and the signal handler 1205 repeat the processes of steps 3834 and later.

If the instruction process has received the protection cancellation notification (Yes in step 3810), the instruction process executes a process of step 3811. In step 3811, the instruction process checks, based on the virtual address included in the protection cancellation notification and the ready notification received from the first process 3701, whether or not write data to be read next by the second process 3702 is already prepared. If the write data is not prepared (No in step 3811), the instruction process repeats the processes of steps 3809 and later.

On the other hand, if the write data is already prepared (Yes in step 3811), the instruction process transfers, to the write process, a write instruction to write the write data (in step 3812) and repeats the processes of steps 3809 and later.

If the write process has received the write instruction (Yes in step 3822), the write process writes the prepared write data to the shared memory 3703 (in step 3823). Then, the write process repeats the processes of steps 3821 and later.

According to the control process illustrated in FIG. 38, the first process 3701 may write data to be read next to the shared memory 3703 based on the progress of the data reading process by the second process 3702. This reduces waiting time caused by the data writing process and improves the efficiency of the inter-process communication.

Next, an example of the memory access profiling is described. In the memory access profiling, a resolver outputs identification information indicating a behavior of a target program from a virtual address accessed during the execution of the target program. As the identification information, information that is a function name, a variable name, or the like and is identifiable by a user may be used.

For example, in the case where the information processing device 701 illustrated in FIG. 7 executes the memory access profiling, the processing section 712 executes the target program and the controller 714 controls the resolver. The resolver is a process generated by the controller 714. The memory 711 stores an identification information table indicating association relationships between virtual addresses to be accessed by the processing section 712 during the execution of the target program and behaviors of the processing section 712.

Then, when the processing section 712 accesses a protected page, the control signal 1204 is generated and the execution of the access to the page is notified to the resolver. In this case, the resolver outputs, based on the identification information table, identification information associated with a notified virtual address.

Figure 39:
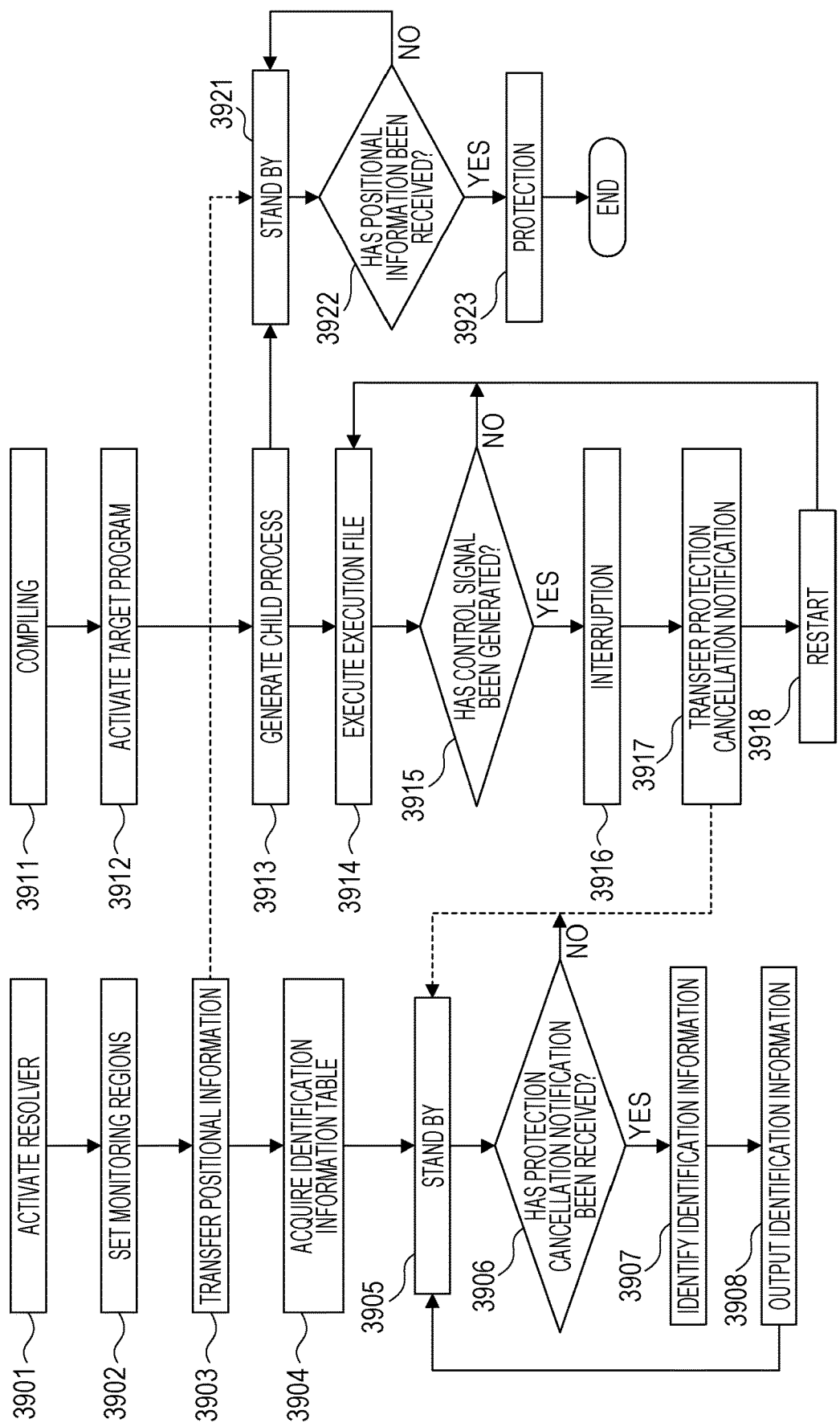
FIG. 39 is a flowchart of a control process in memory access profiling.

FIG. 39 is a flowchart of a specific example of a control process in the memory access profiling. First, the controller 714 activates the resolver (in step 3901). The processing section 712 uses a compiler to compile the target program, thereby generating an execution file including the identification information table (in step 3911). Then, the processing section 712 activates the target program by executing the execution file, and the monitoring section 713 injects an additional code for a monitoring process into the execution file (in step 3912).

Next, the monitoring section 713 executes processes of steps 3902, 3903, 3913, 3915 to 3918, and 3921 to 3923. The processes of steps 3913, 3915 to 3918, and 3921 to 3923 are executed based on the injected additional code.

The processing section 712 uses the execution file to execute a process of step 3914, and the controller 714 uses the resolver to execute processes of steps 3904 to 3908.

The monitoring section 713 generates, based on the additional code, a child process for protecting monitoring regions (in step 3913), and the generated child process executes the processes of steps 3921 to 3923. The processes of steps 3921 to 3923 are the same as or similar to the processes of steps 1331 to 1333 illustrated in FIG. 13.

The monitoring section 713 sets the monitoring regions in the memory-mapped address space 1202 (in step 3902) and transfers, to the child process, positional information indicating the positions of the set monitoring regions (in step 3903).

Next, the resolver acquires the identification information table from the execution file (in step 3904) and waits for a protection cancellation notification from the signal handler 1205 (in step 3905). The resolver checks whether or not the resolver has received the protection cancellation notification from the signal handler 1205 (in step 3906). If the resolver has not received the protection cancellation notification (No in step 3906), the resolver repeats the processes of steps 3905 and 3906.

The processing section 712 executes the execution file while accessing the memory 711 (in step 3914). The signal handler 1205 checks whether or not the control signal 1204 indicating a fault has been generated (in step 3915). If the control signal 1204 has not been generated (No in step 3915), the processing section 712 continues to execute the process of step 3914.

If the control signal 1204 has been generated (Yes in step 3915), the signal handler 1205 interrupts the execution of the execution file (in step 3916). Then, the signal handler 1205 identifies an accessed monitoring region based on the control signal 1204, cancels the protection of the identified monitoring region, and resets protection on a monitoring region for which protection has been canceled in the past. In this case, the signal handler 1205 may record the time when the control signal 1204 has been generated, and the signal handler 1205 may calculate the memory access speed based on the recorded time.

Next, the signal handler 1205 transfers, to the resolver, the protection cancellation notification including a virtual address of the monitoring region for which the protection has been canceled (in step 3917), and the signal handler 1205 restarts the execution of the execution file (in step 3918). Then, the processing section 712 and the signal handler 1205 repeat the processes of steps 3914 and later.

If the resolver has received the protection cancellation notification (Yes in step 3906), the resolver references the identification information table and identifies identification information associated with the virtual address included in the protection cancellation notification (in step 3907). Then, the resolver outputs the identified identification information (in step 3908) and repeats the processes of steps 3905 and later.

According to the control process illustrated in FIG. 39, the resolver may output, based on the progress of a process based on the target program, identification information indicating a behavior of the target program. This enables an operation of the target program to be analyzed based on the identification information.

The configurations of the HPC parallel file systems illustrated in FIGS. 1, 3, 32, and 33 are examples, and one or more constituent elements of the HPC parallel file systems illustrated in FIGS. 1, 3, 32, and 33 may be omitted or changed based on the use or conditions of the HPC parallel file systems illustrated in FIGS. 1, 3, 32, and 33. The configuration of the distributed file system illustrated in FIG. 2 is an example, and one or more constituent elements of the distributed file system illustrated in FIG. 2 may be omitted or changed based on the use or conditions of the distributed file system illustrated in FIG. 2.

The configuration of the information processing device 701 illustrated in FIG. 7 is an example, and one or more constituent elements of the information processing device 701 illustrated in FIG. 7 may be omitted or changed based on the use or conditions of the information processing device 701 illustrated in FIG. 7.

The configuration of the information processing system illustrated in FIG. 9 is an example, and one or more constituent elements of the information processing system illustrated in FIG. 9 may be omitted or changed based on the use or conditions of the information processing system illustrated in FIG. 9. The configurations of the computing nodes 901-$i$ illustrated in FIG. 10 and the configurations of the data nodes 902-$j$ illustrated in FIG. 11 are examples, and one or more constituent elements of the nodes 901-$i$ and 902-$j$ may be omitted or changed based on the use or conditions of the nodes 901-$i$ and 902-$j$.

The flowcharts illustrated in FIGS. 8, 13, 38, and 39 are examples, and one or more processes of the flowcharts illustrated in FIGS. 8, 13, 38, and 39 may be omitted or changed based on the configuration or conditions of the information processing device 701 or the configuration or conditions of the information processing system.

The LMDB data file illustrated in FIGS. 4 and 5 is an example, and the data to be processed may be stored in the memory-mapped file other than the LMDB data file. Data stored in the LMDB data file may not be accessed in sequential order. The data stored in the LMDB data file may be accessed in other order based on a given rule. The data stored in the LMDB data file may be accessed in discrete order.

The virtual address space 601 illustrated in FIG. 6 is an example and is changed based on the configuration or conditions of the information processing system. Instead of the memory mapping to be executed using the paging scheme, memory mapping to be executed using a segment scheme may be used.

The control process illustrated in FIG. 12 is an example, and one or more processes of the control process illustrated in FIG. 12 may be omitted or changed based on the configuration or conditions of the information processing system. For example, instead of the deep learning process 1201, another machine learning process, an artificial intelligence process, or the like may be used.

The parameters illustrated in FIG. 14 are examples, and one or more of the parameters may be omitted or changed based on the configuration or conditions of the information processing system. For example, all the check points CP may not be arranged at the intervals equal to the distance D and may be arranged at different intervals.

The memory-mapped address space 1202 illustrated in FIGS. 15 to 31 is an example, and the state of the memory-mapped address space 1202 is changed based on the parameters such as the page size PS, the range R of the data to be processed, the distance D, and the size S. Data stored in the memory-mapped address space 1202 may not be accessed in sequential order and may be accessed in other order based on a given rule. The data stored in the memory-mapped address space 1202 may be accessed in discrete order.

The results, illustrated in FIGS. 34 to 36, of executing the distributed deep learning are examples. The results of executing the distributed deep learning may vary depending on the configuration or conditions of the information processing system and the data to be processed. The inter-process communication illustrated in FIG. 37 is an example, and the control process is applicable to other inter-process communication.

Figure 40:
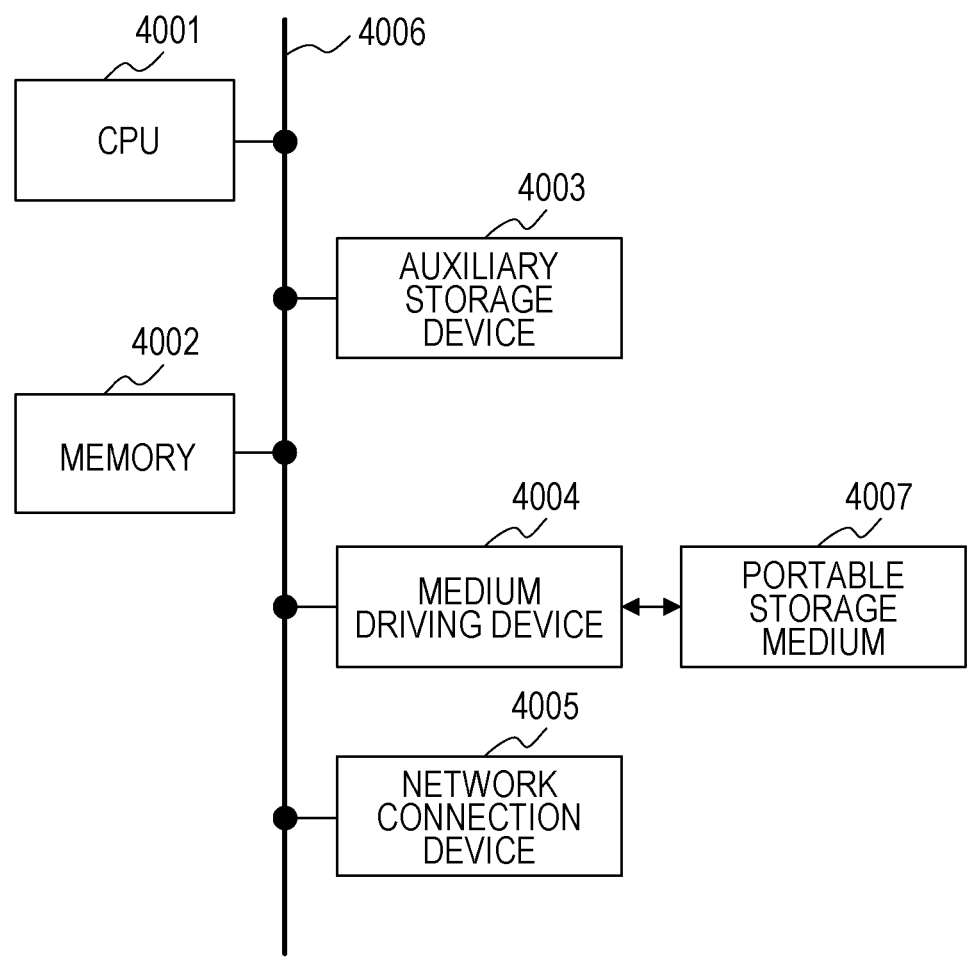
FIG. 40 is a hardware configuration diagram of the information processing device.

FIG. 40 illustrates an example of a hardware configuration of the information processing device (computer) that is used as each of the computing nodes 901-*i* illustrated in FIG. 10 and the data nodes 902-*j* illustrated in FIG. 11. The information processing device illustrated in FIG. 40 includes a CPU 4001, a memory 4002, an auxiliary storage device 4003, a medium driving device 4004, and a network connection device 4005. These constituent elements are connected to each other via a bus 4006.

The memory 4002 is, for example, a semiconductor memory such as a read only memory (ROM), a random access memory (RAM), or a flash memory and stores a program and data that are used for the processes. The memory 4002 may be used as the memory 711 illustrated in FIG. 7, a memory 1001-*i* illustrated in FIG. 10, or a memory 1101-*j* illustrated in FIG. 11.

The CPU (processor) 4001 uses the memory 4002 to execute the program, thereby operating as the processing section 712 illustrated in FIG. 7, the monitoring section 713 illustrated in FIG. 7, and the controller 714 illustrated in FIG. 7. The CPU 4001 uses the memory 4002 to execute the program, thereby operating as a processing section 1002-*i* illustrated in FIG. 10, a monitoring section 1003-*i* illustrated in FIG. 10, and a controller 1004-*i* illustrated in FIG. 10. The CPU 4001 uses the memory 4002 to execute the program, thereby operating as a controller 1102-*j* illustrated in FIG. 11.

The auxiliary storage device 4003 is, for example, a magnetic disk device, an optical disc device, a magneto-optical disc device, a tape device, or the like. The auxiliary storage device 4003 may be an SSD, an HDD, or a flash memory. The information processing device may cause the program and the data to be stored in the auxiliary storage device 4003, load the program and the data into the memory 4002, and use the program and the data. The auxiliary storage device 4003 may be used as the memory 711 illustrated in FIG. 7, the memory 1001-*i* illustrated in FIG. 10, or the memory 1101-*j* illustrated in FIG. 11.

The medium driving device 4004 drives a portable recording medium 4007 and accesses details recorded in the portable recording medium 4007. The portable recording medium 4007 is a memory device, a flexible disk, an optical disc, a magneto-optical disc, or the like. The portable recording medium 4007 may be a compact disc-read only memory (CD-ROM), a digital versatile disc (DVD), a Universal Serial Bus (USB) memory, or the like. An operator or a user may cause the program and the data to be stored in the portable recording medium 4007, load the program and the data into the memory 4002, and use the program and the data.

A computer-readable recording medium that stores the program and the data that are used for the processes is a physical (non-transitory) recording medium such as the memory 4002, the auxiliary storage device 4003, or the portable recording medium 4007.

The network connection device 4005 is a communication interface circuit connected to the communication network 903 and configured to execute data conversion for communication. The network connection device 4005 may be an HCA 3304 illustrated in FIG. 33 or an HCA 3311 illustrated in FIG. 33. The information processing device may receive the program and the data from an external device via the network connection device 4005, load the program and the data into the memory 4002, and use the program and the data.

In addition, the information processing device may include a GPU 3213 illustrated in FIG. 32 or a GPU 3303 illustrated in FIG. 33.

In the case where the information processing device interacts with the operator or the user, the information processing device may include an input device and an output device. The input device is, for example, a keyboard, a pointing device, or the like and is used to input an instruction and information from the operator or the user. The output device is, for example, a display device, a printer, a speaker, or the like and is used to output processing results and an inquiry to the operator or the user or an instruction to the operator or the user. The processing results may be learned results of the distributed deep learning or may be the identification information output by the resolver in the memory access profiling.

The information processing device may not include all the constituent elements illustrated in FIG. 40. One or more of the constituent elements illustrated in FIG. 40 may be omitted based on the use or conditions of the information processing device. For example, if the portable recording medium 4007 is not used, the medium driving device 4004 may be omitted.

The memory stores the information indicating the virtual address space for the data to be processed. The processor executes, via the virtual address space, a given process on the data to be processed, accesses multiple monitoring regions set as targets to be monitored among a plurality of regions included in the virtual address space, and executes given control based on a virtual address of an accessed monitoring region that is among the multiple monitoring regions and for which the access has been detected by the processor. Although the disclosed embodiment and advantages of the disclosed embodiment are described above, a person skilled in the art may make various changes, additions, and omissions without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
   a memory that stores information indicating a virtual address space for data to be processed; and
   a processor that executes, via the virtual address space, a given process on the data to be processed, monitors access from the processor to multiple monitoring regions among a plurality of regions included in the virtual address space and have been set as targets to be monitored, and executes given control based on an accessed monitoring region among the multiple monitoring regions and for which the access has been detected by the processor.

2. The information processing device according to claim 1,
wherein the multiple monitoring regions are set so that the multiple monitoring regions are not adjacent to each other in the virtual address space,
wherein the processor accesses the plurality of regions included in the virtual address space in given order in the given process, and
wherein when the processor protects the multiple monitoring regions before the start of the given process and a control signal indicating access to a protected monitoring region is generated after the start of the given process, the processor identifies the accessed monitoring region based on the control signal and a virtual address of the identified monitoring region.

3. The information processing device according to claim 2,
wherein the processor cancels the protection of the identified monitoring region and monitors access to a next monitoring region, and
wherein the processor executes the given process by accessing the monitoring region for which the protection has been canceled.

4. The information processing device according to claim 1,
wherein the data to be processed is distributed and stored in multiple storage devices connected to the information processing device via a communication network,
wherein the memory stores data corresponding to a region among the plurality of regions included in the virtual address space, and
wherein the processor estimates, based on an accessed virtual address for which the access has been detected by the processor, an address range of virtual addresses to be accessed by the processor, transmits a data transfer request to a storage device which stores partial data of the estimated address range among the multiple storage devices, and causes the partial data received from the storage device which stores the partial data to be stored in the memory.

5. The information processing device according to claim 1,
wherein the data to be processed is to be transferred from a first process to a second process,
wherein the memory stores data corresponding to a region among the plurality of regions included in the virtual address space,
wherein the processor controls the first process to cause the first process to write the data to be processed to the memory,
wherein the processor controls the second process to cause the second process to read the data to be processed from the memory, and
wherein the processor causes, based on an accessed virtual address for which the access has been detected by the processor, the first process to write data to be transferred to the second process.

6. The information processing device according to claim 1,
wherein the memory stores data corresponding to a region among the plurality of regions included in the virtual address space and stores association relationships between virtual addresses to be accessed by the processor in the given process and identification information indicating behaviors of the processor in the given process, and
wherein the processor outputs, based on the association relationships, identification information associated with an accessed virtual address for which the access has been detected by the processor.

7. An information processing method comprising:
causing a computer to execute, via a virtual address space for data to be processed, a given process on the data to be processed;
monitoring, with the computer, access to multiple monitoring regions that are among a plurality of regions included in the virtual address space and have been set as targets to be monitored; and
executing, with the computer, given control based on a virtual address of an accessed monitoring region that is among the multiple monitoring regions and for which the access has been detected.

8. The information processing method according to claim 7, further comprising:
setting the multiple monitoring regions so that the multiple monitoring regions are not adjacent to each other in the virtual address space;
protecting the multiple monitoring regions before the start of the given process;
accessing the plurality of regions included in the virtual address space in given order in the given process;
generating a control signal when the monitoring indicates access to a protected monitoring region; and
identifying the accessed monitoring region based on the control signal and a virtual address of the identified monitoring region.

9. The information processing method according to claim 8, further comprising:
canceling the protection of the identified monitoring region;
the monitoring monitors access to a next monitoring region; and
the accessing accesses the monitoring region for which the protection has been canceled.

10. The information processing method according to claim 7, further comprising:
storing the data to be processed in a distributed manner in multiple storage devices connected to the computer via a communication network
the computer includes a memory which stores data corresponding to a region among the plurality of regions included in the virtual address space;
estimating, based on an accessed virtual address for which the access has been detected, an address range of virtual addresses to be accessed;
transmitting a data transfer request to a storage device which stores partial data of the estimated address range among the multiple storage devices; and
causing the partial data received from the storage device which stores the partial data to be stored in the memory.

11. A non-transitory, computer-readable recording medium having stored therein a program for causing a computer to execute a process, the process comprising:
executing, via a virtual address space for data to be processed, a given process on the data to be processed;
monitoring access to multiple monitoring regions that are among a plurality of regions included in the virtual address space and have been set as targets to be monitored; and executing given control based on a virtual address of an accessed monitoring region that is among the multiple monitoring regions and for which the access has been detected.

12. The non-transitory, computer-readable recording medium according to claim 11, the process further comprising:
setting the multiple monitoring regions so that the multiple monitoring regions are not adjacent to each other in the virtual address space;
protecting the multiple monitoring regions before the start of the given process;
accessing the plurality of regions included in the virtual address space in given order in the given process;
generating a control signal when the monitoring indicates access to a protected monitoring region; and
identifying the accessed monitoring region based on the control signal and a virtual address of the identified monitoring region.

13. The non-transitory, computer-readable recording medium according to claim 12, the process further comprising:
canceling the protection of the identified monitoring region;
the monitoring monitors access to a next monitoring region; and
the accessing accesses the monitoring region for which the protection has been canceled.

14. The non-transitory, computer-readable recording medium according to claim 11, the process further comprising:
storing the data to be processed in a distributed manner in multiple storage devices connected to the computer via a communication network
the computer includes a memory which stores data corresponding to a region among the plurality of regions included in the virtual address space;
estimating, based on an accessed virtual address for which the access has been detected, an address range of virtual addresses to be accessed;
transmitting a data transfer request to a storage device which stores partial data of the estimated address range among the multiple storage devices; and
causing the partial data received from the storage device which stores the partial data to be stored in the memory.

* * * * *